(12) United States Patent
Azuma

(10) Patent No.: US 7,376,797 B2
(45) Date of Patent: May 20, 2008

(54) CACHE MEMORY SYSTEM AND METHOD USING REFERENCE BITS

(75) Inventor: Tetsuhiko Azuma, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 406 days.

(21) Appl. No.: 10/449,108

(22) Filed: Jun. 2, 2003

(65) Prior Publication Data

US 2004/0181633 A1    Sep. 16, 2004

(30) Foreign Application Priority Data

Mar. 11, 2003    (JP) .............................. 2003-065192

(51) Int. Cl.
*G06F 12/02*    (2006.01)

(52) U.S. Cl. ...................................... 711/144; 711/156

(58) Field of Classification Search ...................... None
See application file for complete search history.

(56) References Cited

U.S. PATENT DOCUMENTS 5,319,766 A * 6/1994 Thaller et al. .............. 711/146
6,000,017 A * 12/1999 Hayek et al. ............... 711/144
7,120,836 B1 * 10/2006 Englin et al. ................ 714/53

FOREIGN PATENT DOCUMENTS

| JP | 63-129441 | 6/1988 |
|---|---|---|
| JP | 64-42749 | 2/1989 |
| JP | 3-235148 | 10/1991 |
| JP | 4-124749 | 4/1992 |
| JP | 5-158744 | 6/1993 |
| JP | 5-303528 | 11/1993 |
| JP | 6-83713 | 3/1994 |
| JP | 6-89221 | 3/1994 |
| JP | 6-89222 | 3/1994 |
| JP | 7-152652 | 6/1995 |
| JP | 9-245490 | 9/1997 |
| JP | 10-21733 | 1/1998 |
| JP | 2000-181801 | 6/2000 |
| JP | 2003-91454 | 3/2003 |

* cited by examiner

*Primary Examiner*—B. James Peikari
(74) *Attorney, Agent, or Firm*—Oblon, Spivak, McClelland, Maier & Neustadt, P.C.

(57) ABSTRACT

A cache memory system includes a cache memory having a plurality of entries associated with a plurality of information storage units. Each of the information storage units is configured to store part of the information stored in a main memory. Reference bit storage units store a use status of entry data for a certain period of time. A hit detection circuit is connected to the information storage units. The hit detection circuit generates a hit signal to each of the reference bit storage units when the entry data is determined to satisfy use conditions.

14 Claims, 22 Drawing Sheets

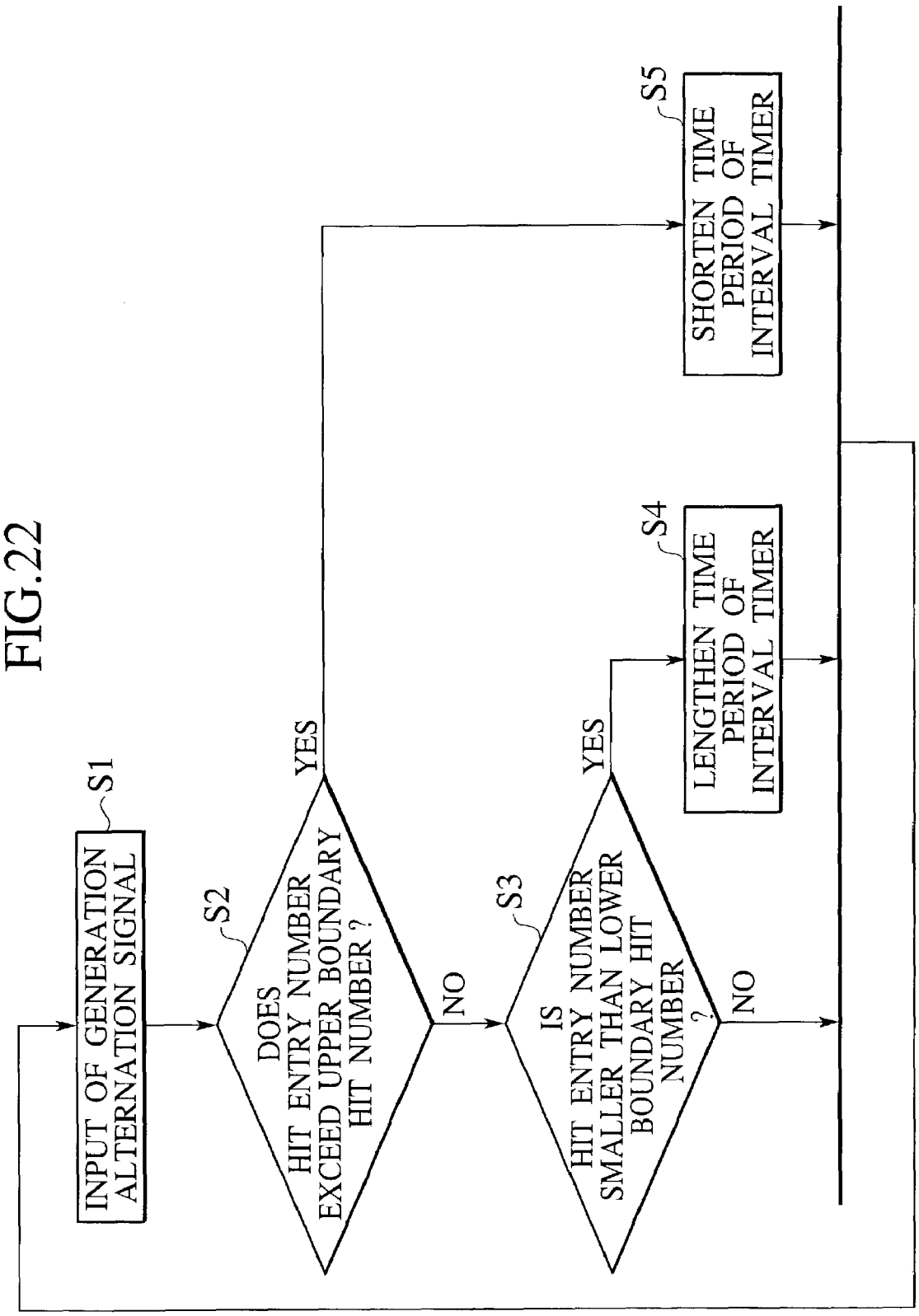

CACHE MEMORY SYSTEM AND METHOD USING REFERENCE BITS

CROSS REFERENCE TO RELATED APPLICATIONS

This application is based upon and claims the benefit of priority from prior Japanese Patent Application P2003-65192 filed on Mar. 11, 2003; the entire contents of which are incorporated by reference herein.

BACKGROUND OF THE INVENTION

1. Field of the Invention

The present invention relates to a cache memory system, and specifically, to an updating method and an updating program for a cache memory system.

2. Description of the Related Art

Cache memories currently used in a microprocessor and the like, in which address translation information and data are stored, are configured to store a plurality of sets of information that is a part of the information stored in a main memory. A cache memory storing the address translation information is referred to as an address cache or a Translation Look-aside Buffer (TLB). A cache memory storing data is referred to as a data cache. A storage area stores a set of information data. Such data is simply referred to as "entry." The cache memories themselves cannot store all the information required by a CPU of a computer system. Therefore, it is necessary to fetch new information data from a main memory and update the cache memories with the new information.

There are various methods for storing the address translation information of the TLB or the data cache in the cache memory itself and for utilizing the TLB or the data cache. As for a cache memory that is fully associative, a method for randomly selecting an entry data is employed in order to prevent a complex circuit design.

However, in terms of frequency of usage, same data entries that are less frequently used should be updated in each set of entry information in a cache memory. On the other hand, it is inappropriate to update some entries because they are more frequently used. The method for randomly selecting an entry raises the possibility that the more frequently used entries are updated.

Thus, the entry information that has been updated must be reregistered. As a result of reregistering entry information, time efficiency is reduced and performance is degraded.

In the case of a fully associative cache memory, the random entry method is used to select an entry to be updated, so as to avoid a complicated circuit design. Accordingly, there is a possibility that a more frequently used entry is updated.

SUMMARY OF THE INVENTION

In order to solve the above problems, a first aspect of the present invention inheres in a cache memory having a plurality of data storage areas for storing entry data. An information storage unit is configured to fetch and store a part of the information stored in a main memory and a reference bit storage unit is configured to store a use status of information stored in the information storage unit for a certain time period.

A second aspect of the present invention inheres in a cache memory system including a cache memory having a plurality of data storage areas for storing entry data. Each of the data storage areas is associated with an information storage unit configured to fetch and store a part of the information stored in a main memory and a reference bit storage unit configured to store a use status of information stored in the corresponding information storage unit for a certain time period. A hit detection circuit is connected to the information storage units, the hit detection circuit is configured to generate a hit signal to each of the reference bit storage units.

A third aspect of the present invention inheres in an updating method for a cache memory having a plurality of segments. Each segment includes a plurality of data entries. The updating method includes sending reference bits associated with the respective entries from reference bit storage units to a processing circuit and generating a position number of a selected data entry and an unused entry presence signal. Data entry shuffle is performed by repeatedly rotating the plurality of data entries and generating the position number of the selected entry and the unused entry presence signal.

A fourth aspect of the present invention inheres in an updating method for a cache memory system including a process of sending a generation alternation signal from an interval timer to a reference bit storage unit storing a reference bit. The process includes determining whether a number of hit entries is larger than an upper boundary hit number set in an upper boundary hit number register. A determination is also made whether the number of hit entries is smaller than a lower boundary hit number set in a lower boundary hit number register when the number of hit entries is not larger than the upper boundary hit number. A period of the interval timer is shortened when the number of hit entries is larger than the upper boundary hit number, and the period of the interval timer is lengthened when the number of hit entries is smaller than the lower boundary hit number.

A fifth aspect of the present invention inheres in an updating program for a cache memory system to be executed by a computer. The cache memory system is configured to include an unused entry detection block connected to a reference bit storage unit. An interval timer, an upper boundary hit number register connected to the unused entry detection block; and a lower boundary hit number register are system components. The updating program for a cache memory system includes an instruction to send a generation alternation signal from the interval timer to the reference bit storage units, an instruction to determine whether the number of hit entries is larger than an upper boundary hit number set in the upper boundary hit number register, an instruction to determine whether the number of hit entries is smaller than a lower boundary hit number set in the lower boundary hit number register when the number of hit entries is not larger than the upper boundary hit number; an instruction to shorten a period of the interval timer when the number of hit entries is larger than the upper boundary hit number, and an instruction to lengthen the period of the interval timer when the number of hit entries is smaller than the lower boundary hit number.

A sixth aspect of the present invention inheres in an updating program product stored on a memory medium. The program is executed by a computer. The cache memory system includes an unused entry detection block connected to a reference bit storage unit, an interval timer, an upper boundary hit number register connected to the unused entry detection block, and a lower boundary hit number register. The updating program includes an instruction to send a generation alternation signal from the interval timer to the reference bit storage unit; an instruction to determine whether the number of hit entries is larger than an upper boundary hit number set in the upper boundary hit number register, an instruction to determine whether the number of hit entries is smaller than a lower boundary hit number set in the lower boundary hit number register when the number of hit entries is not larger than the upper boundary hit number, an instruction to shorten a period of the interval timer when the number of hit entries is larger than the upper boundary hit number, and an instruction to lengthen the period of the interval timer when the number of hit entries is smaller than the lower boundary hit number.

BRIEF DESCRIPTION OF DRAWINGS

FIG. 22 is a flow chart based on a determination algorithm in an unused entry detection block constituting the cache memory system according to the second embodiment of the present invention.

DETAILED DESCRIPTION OF THE INVENTION

Figure 1:
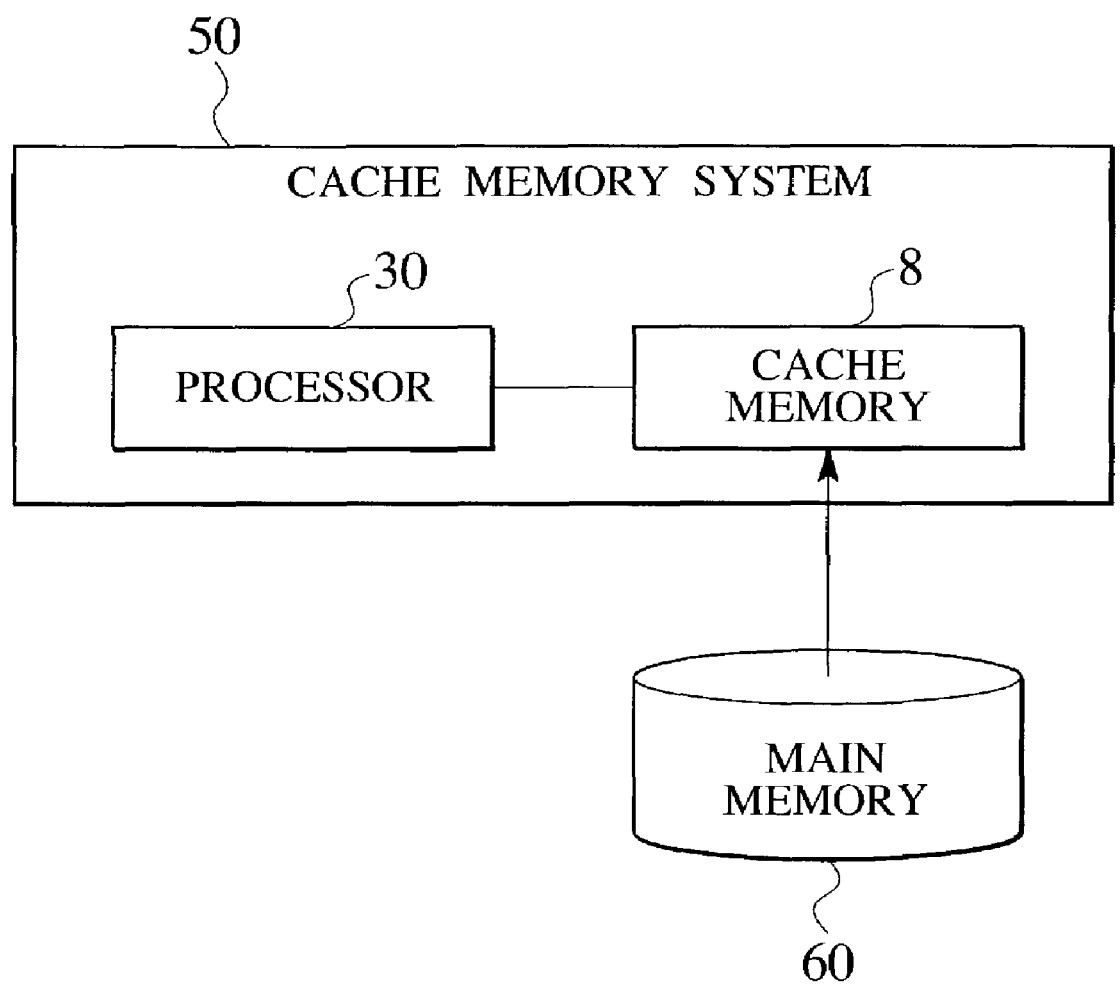
FIG. 1 is a block diagram schematically showing a cache memory system according to the first embodiment of the present invention, showing a connection relationship between the cache memory system and a main memory.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set forth such as specific signal values, etc. to provide a thorough understanding of the present invention. However, it will be obvious to those skilled in the art that the present invention may be practiced without such specific details. In other instances, circuits well-known have been shown in block diagram form in order not to obscure the present invention in unnecessary detail.

EMBODIMENTS

The First and Second Embodiments Shown below exemplify an apparatus or a method for embodying technical ideas of the present invention. The technical ideas are not intended to be limited by structures, arrangements, or the like of the components described below. Various modifications can be added to the technical ideas of the present invention within the scope of claims.

In the embodiments of the present invention, as shown in FIG. 1, a "cache memory system" 50 includes a cache memory 8 as a part of the components thereof. Specifically, the cache memory system 50 includes a semiconductor integrated circuit comprising the cache memory 8 and peripheral circuits thereof and a processor 30. Alternatively, the cache memory system 50 includes a digital signal processor, a custom LSI, a timer LSI, or the like. The cache memory 8 is supplied with information from a main memory 60 which is an external main memory.

In a "fully associative system," information data can be written or stored as entries, i.e., data without limitation. Specifically, the "fully associative system" does not employ a method of selecting an entry to be updated in accordance with a rule by use of part of the information contained in the address information and then writing information in the selected entry. In the embodiments of the present invention, the "cache memory system" includes a fully associative cache memory or a similar constitution that is built-in or externally attached thereto. The cache memory 8 is an address cache or a data cache. The cache memory system receives and holds usage histories of the respective entries of the cache memory by generation management using a timer and selects an unused entry when updating the contents of the cache memory with new information.

Moreover, in order to efficiently perform the function described above, the "cache memory system" of the present invention automatically adjusts a period of the timer by utilizing and evaluating the usage histories of the respective entries.

In the embodiments of the present invention, a description will be given of a cache memory system, a cache memory, an updating method for the cache memory and for the cache memory system, and an updating program for the cache memory system. An updating entry can be automatically selected from among unused entries to provide efficient use of time. Software does not need to repeat the setting of the period of the timer frequently, and the period of the timer can be automatically adjusted.

First Embodiment

Figure 2:
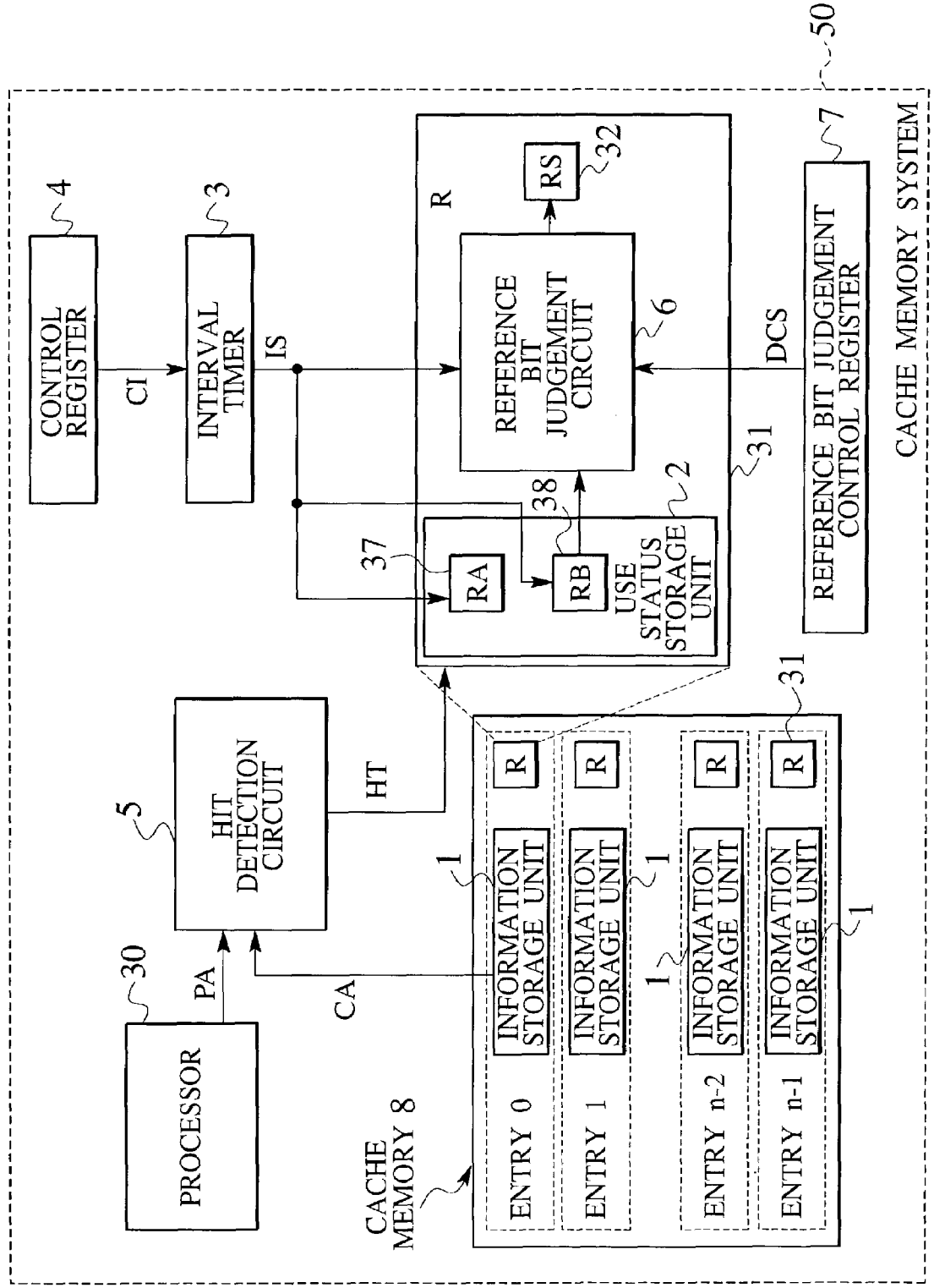
FIG. 2 is a block diagram showing the cache memory system according to the first embodiment of the present invention, including a connection relationship between the cache memory and an interval timer.
Figure 9:
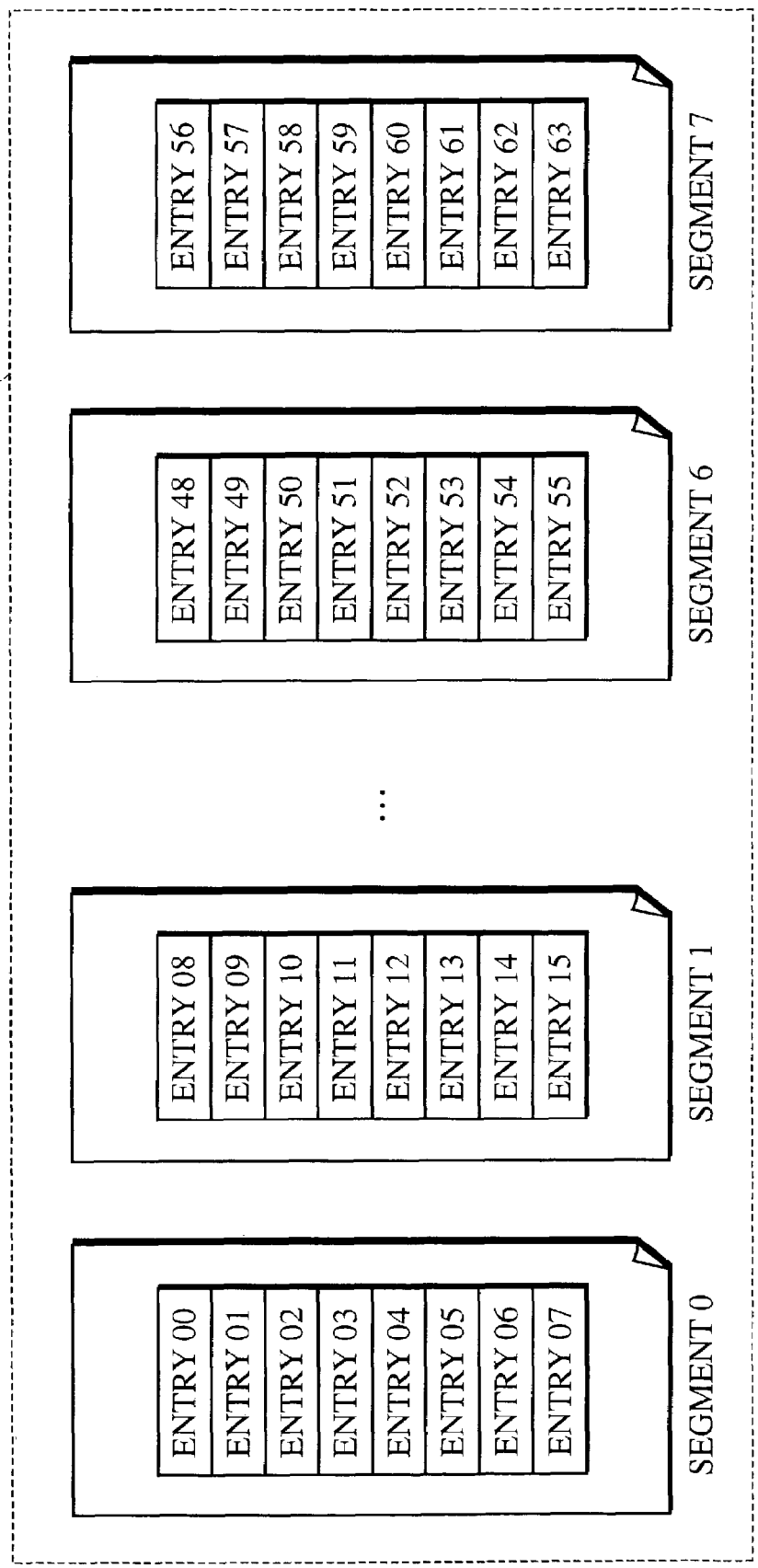
FIG. 9 is a schematic diagram showing a method of dividing a cache memory into eight segments, each being composed of eight entries, in the case where the cache memory is composed of 64 entries.
Figure 13:
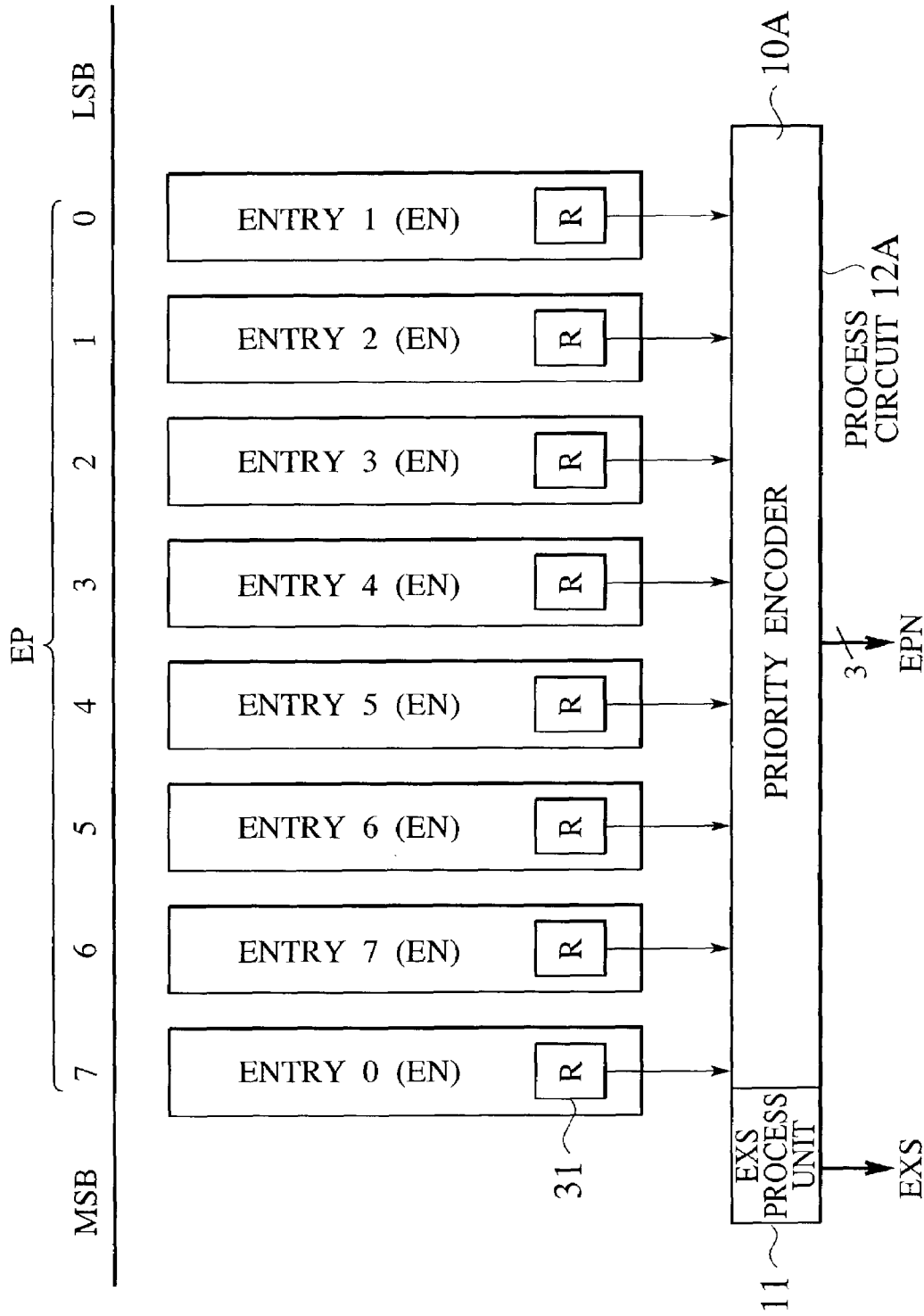
FIG. 13 is a schematic diagram illustrating the status after the rotation of the entry shuffle in the segment to be updated.
Figure 14:
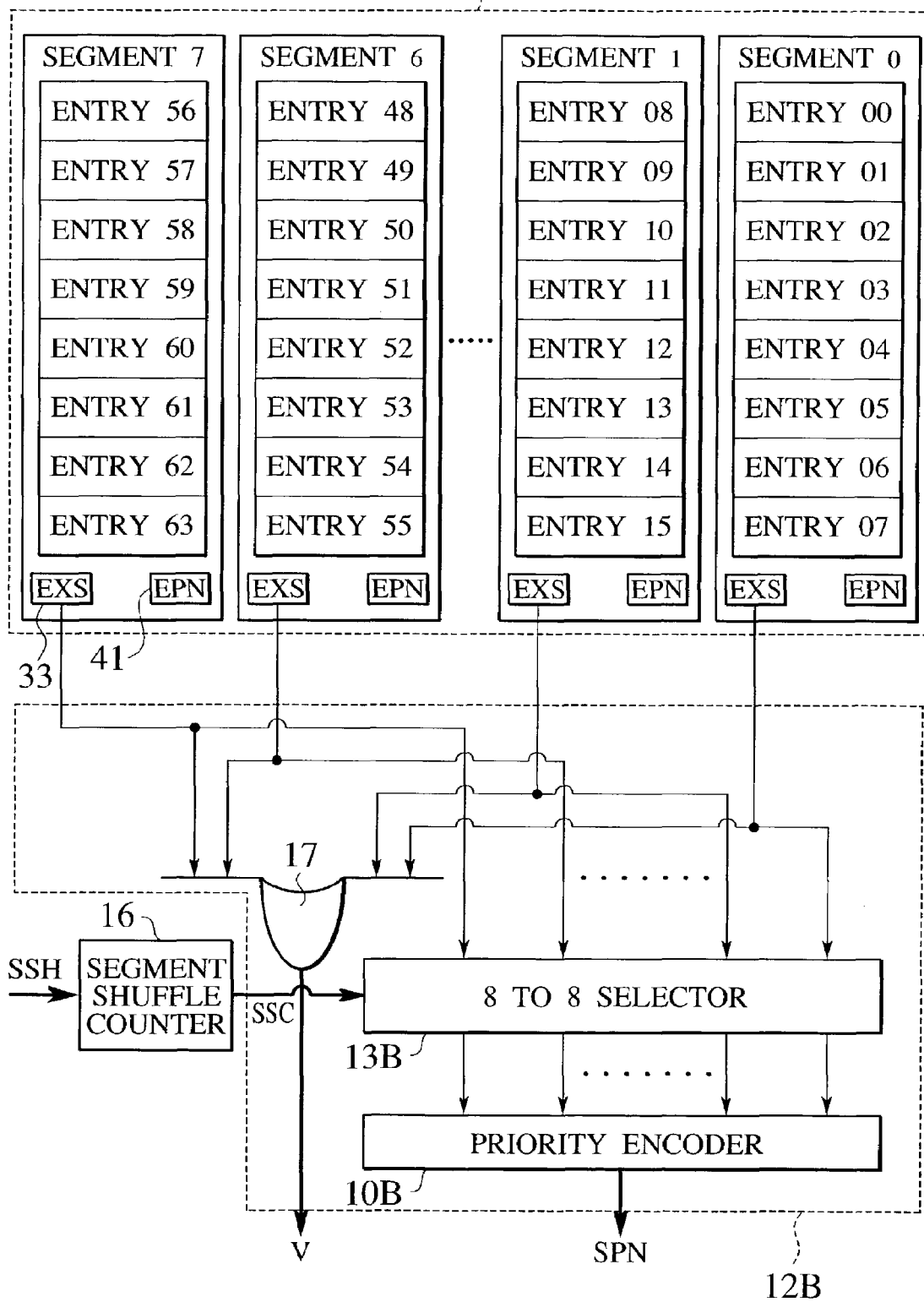
FIG. 14 is a block diagram schematically showing the entire hardware for eight segments constituting the cache memory according to the first embodiment of the present invention.

As shown in FIG. 2, the cache memory system 50 according to the first embodiment of the present invention includes a cache memory 8, a hit detection circuit 5, a control register 4, an interval timer 3, reference bit storage units 31 storing a reference bit R and a processor 30. As shown in FIG. 2, the cache memory 8 includes information storage units 1 each corresponding to one of n entries from an entry 0 to an entry n−1 and reference bit storage units 31 storing n reference bits R corresponding to the respective information storage units 1. Specifically, as shown in FIGS. 9 and 14 described later, the cache memory 8 is composed of a plurality of segments. Each of the segments is composed of a plurality of entries. Each of the entries corresponds to one of the information storage units 1 and one of the reference bit storage units 31. Each reference bit storage unit 31 includes a use status storage unit 2, a reference bit judgement circuit 6, and a selected reference bit storage unit 32 storing a selected reference bit RS. The use status storage unit 2 includes a first reference bit storage unit 37 storing a first reference bit RA and a second reference bit storage unit 38 storing a second reference bit RB. The hit detection circuit 5 compares cache address information CA generated from the entries 0, 1, . . . , n−2, and n−1 in each of the information storage units 1 of the cache memory 8 to processor cache access address information PA generated from the processor 30. The hit detection circuit 5 generates a hit signal HT to one of the reference bit storage units 31. Control information CI, generated from the control register 4, is sent to the interval timer 3. The interval timer 3 supplies a generation alternation signal IS for the first reference bit storage unit 37 and the second reference bit storage unit 38 in the use status storage unit 2 and a reference bit judgement circuit 6. Note that, in FIG. 2, a description of components described later in FIGS. 10 to 17, such as priority encoders 10A and 10B and processing circuits 12A and 12B, are omitted.

First, a description is given of the cache memory 8 of the fully associative system including n data entries. In the "fully associative system," information can be written or stored in any information storage unit without limitation. Specifically, the "fully associative system" does not employ a method of selecting an updating entry, in accordance with a rule, by use of part of the information contained in the address information and then writing information as the selected entry. On the other hand, regardless of the constitution of the cache memory, such as the fully associative system or a non-fully associative system, a memory capacity of the cache memory built into the processor is generally small. Accordingly, the memory capacity of the cache memory is less than the amount of information that is wanted or required to be stored therein. In recent years, since operating frequency of the processor has been dramatically increased, time loss in data transmission and reception between the processor and a large capacity memory externally connected to the processor has become a problem. However, the cache memory plays an important role in reducing the time loss by the high speed operation thereof.

The cache memory itself has a memory capacity limitation and does not have a sufficient capacity to store the necessary information. Accordingly, contents of the cache memory itself must be often updated. To update the contents, the entry to be updated is selected by using various algorithms, depending on the constitution of the cache memory.

Generally, in the non-fully associative cache memory, for example, in the n-way set associative cache memory, even if a large number of entries are included, the number of data entries to be judged for updating is reduced when judging whether the entry should be updated. Compared with the non-fully associative system, all, or a large number of entries, need to be targeted for examination in the fully associative system.

However, in such case, if an algorithm (e.g., Least Recently Used (LRU)) employed in the non-fully associative system is employed in the fully associative system, the circuit itself becomes very complicated and enormous, thus adverse effects are imposed on the operating speed of the processor. Therefore, in the fully associative cache memory, the method of randomly selecting the entry to be updated has been employed.

However, in this method of randomly selecting an entry to be updated, there is a possibility that a more frequently used entry that is scheduled to be used in the future may be updated. If the entry scheduled to be used in the future is updated, the performance of the processor will be degraded.

The reference bit storage unit 31 is a register storing a use status, in other words, a hit status for a certain past or prior time period. For a simple reference bit storage unit 31, the register is composed of two bits and stores a use status "used (hit)/unused (miss)" for a certain past or prior time period. The selected reference bit RS is information generated from a register in the use status storage unit 2 through the reference bit judgement circuit 6. The register stores the number of translation times for certain current and past periods. The selected reference bit RS is stored in the selected reference bit storage unit 32.

Herein, a dedicated timer is used to examine the use status for a certain time period. First, a description will be given of an example of a method of narrowing down the options of the unused entries by using information referred to as reference bits R, which store the use history information of each entry for a certain period by use of the timer.

The reference bits R to be stored in the reference bit storage units 31 are included in the respective entries 0, 1 . . . , n−2, and n−1 of the cache memory 8. Each of the reference bits R is information indicating a status of whether the corresponding entry 0, 1 . . . , n−2, or n−1 is referred to and used within a certain time. The reference bit judgement circuit 6 that generates the selected reference bit RS practically determines whether each entry has been used.

For each entry, the information storage unit 1 is a storage area (storage element) for storing information. In the case of the TLB used for address conversion, the information storage unit 1 stores address information to be compared with a virtual address generated from the processor 30 (FIG. 2) and "address information for replacement" used for replacement of the address information. In the case of the data cache, the information storage unit 1 stores address information to be compared with a physical address generated from the processor 30 (FIG. 2) through the TLB and data body itself to be temporally held in the cache memory 8. The address information to be compared with the generated physical address is an equivalent of an address of the main memory when data is stored in the main memory.

The use status storage unit 2 is a register storing information as to whether or not the information in each of the entries 0, 1 . . . , n−2, and n−1 of the cache memory 8 has been actually used; the register being a kind of memory.

The selected reference bit RS stored in the selected reference bit storage unit 32 is determined by the reference bit judgement circuit 6 based on information of an internal status value of the use status storage unit 2. The status value is two or more bits for each of the entries 1, 2 . . . , n−2, and n−1 of the cache memory 8. For an algorithm of the internal status value stored in the use status storage unit 2, as described above, there is an example where the use status (used (hit)/unused (miss)) of each entry for a certain past and current time periods is stored and an example where the number of times to use each entry for a certain period is stored in a saturated counter. Herein, a description will be given based on the example of whether each entry has been used for certain past and current periods is stored, with reference to FIG. 3.

The interval timer 3 is a circuit mainly composed of a counter that measures an arbitrary period of time in accordance with the setting value of the control register 4 and generates the alternation signal IS. Specifically, in order to manage the use status at certain intervals, a dedicated timer (time period measuring device) is used. This dedicated timer is referred to as the "interval timer 3." In the interval timer 3, operation specifications, such as a setting of the period, is controlled by the setting value of the dedicated control register 4 which stores the setting value. The control register 4 is a register and a kind of a memory allowing an operation of the interval timer 3, such as a time period controlled by software. The hit detection circuit 5 compares processor cache access address information PA, supplied when the processor 30 accesses the cache memory 8, with cache address information CA for each entry stored in the information storage unit 1 of the cache memory 8. The detection circuit also determines whether there is an entry having the cache address information CA, which agrees with the processor cache access address information PA. When there is an entry having the cache address information CA, which agrees with the processor cache access address information PA, a hit signal HT is generated based on the entry number. Moreover, in the use status storage unit 2 of the corresponding entry, the internal status values of the first and second reference bits RA and RB respectively stored in the first and second reference bit storage units 37 and 38 are set to 1. As an example of storing the use status (used (hit)/unused (miss)) of each entry for a certain past and current time periods, for each entry, the use status storage unit 2 is designed to include the first and second reference bit storage units 37 and 38 to generate the status value of the reference bit R, which is stored in the reference bit storage unit 31.

For the internal status values of the first and second reference bits RA and RB respectively stored in the first and second reference bit storage units 37 and 38, generation of the values is performed by the generation alternation signal IS generated from the interval timer 3. In the "generation management," for each of the first and second reference bits RA and RB respectively stored in the first and second reference bit storage units 37 and 38, the generation thereof is defined as "old reference bit" or "current reference bit."

Each of the first and second reference bits RA and RB respectively stored in the first and second reference bit storage units 37 and 38 is given a name, such as "old (for a certain time period)" or "current". The first and second reference bit storage units 37 and 38 for storing the first reference bit RA or the second reference bit RB defined as "old", respectively serves as a storage register that records and holds the presence of a cache memory entry hit for a certain past period. The first and second reference bit storage units 37 and 38 for storing the first reference bit RA or the second reference bit RB defined as "current", respectively serves as a storage register that records the presence of a cache memory entry hit for a certain period defined as "current".

Figure 3:
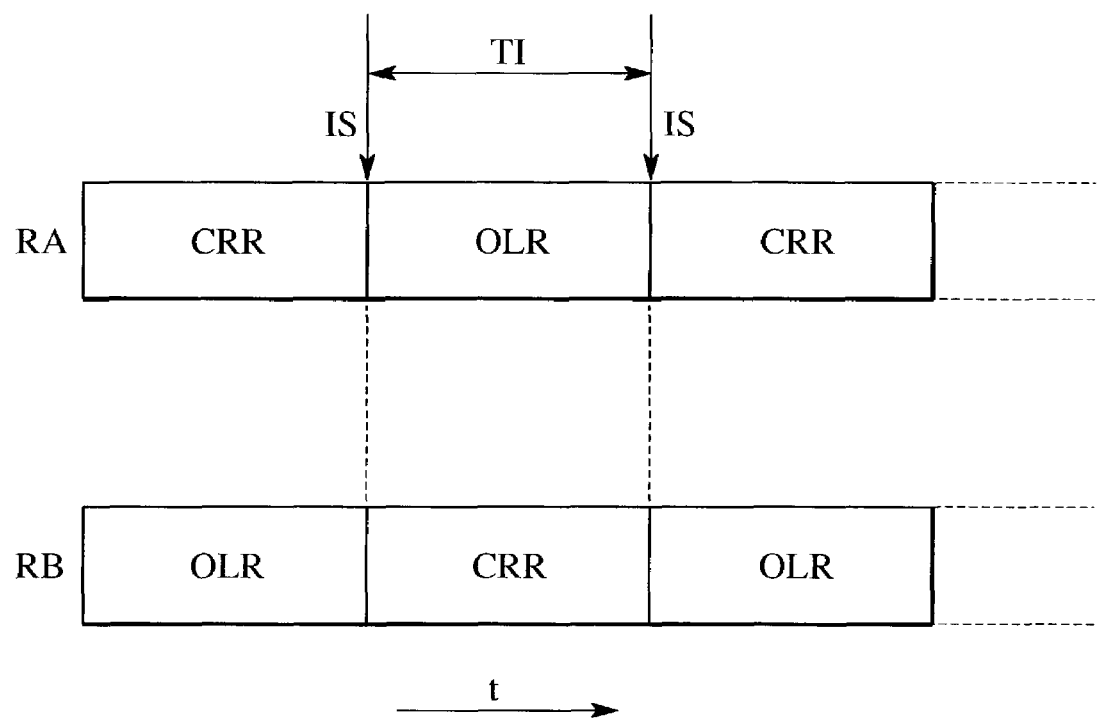
FIG. 3 is a schematic diagram showing variation of internal status values of the first reference bit RA and the second reference bit RB due to a generation alternation signal from the interval timer and a period of the interval timer.
Figure 4:
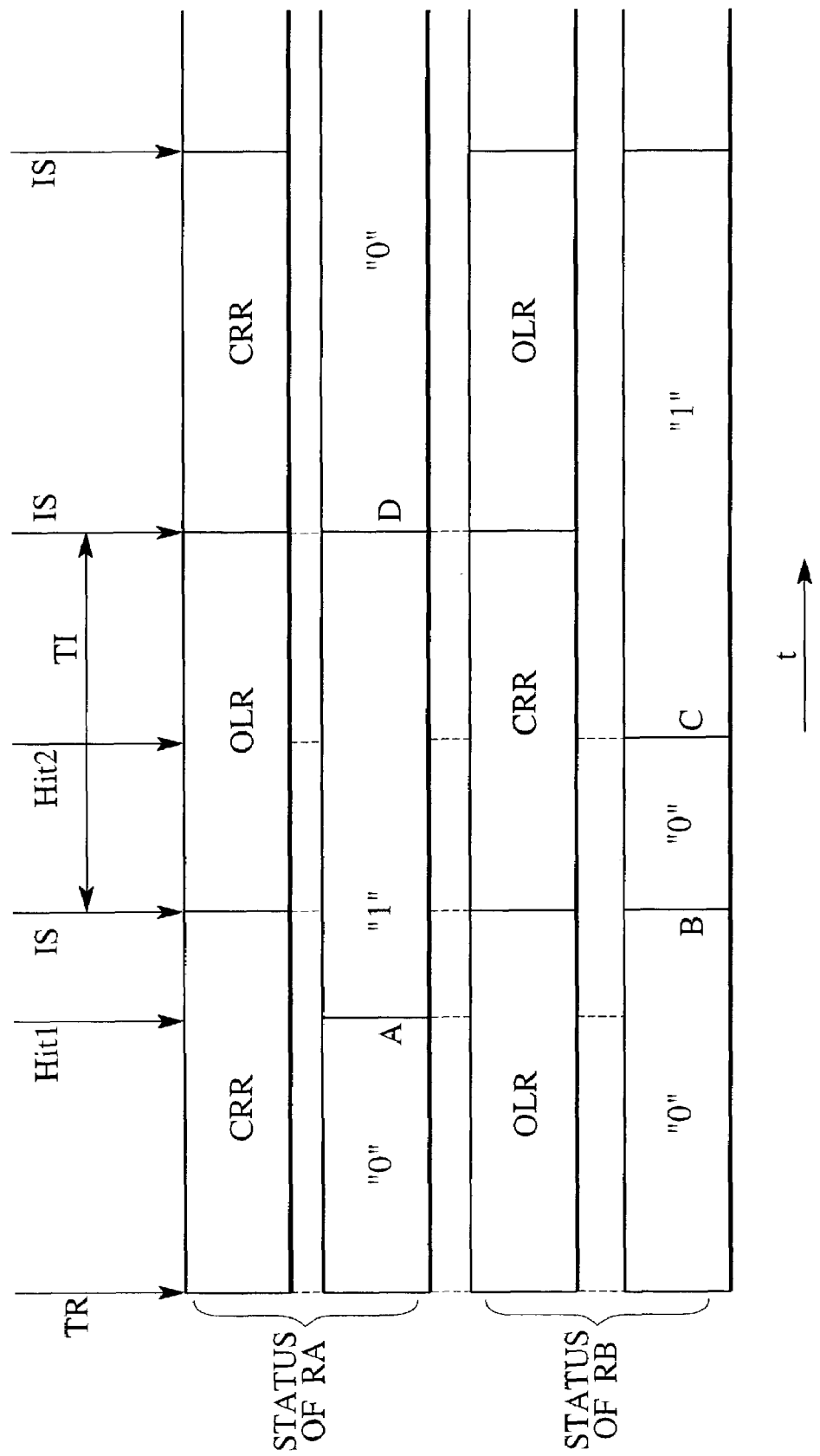
FIG. 4 is a schematic diagram showing changes and operations of the internal status values of the first reference bit RA and the second reference bit RB in an example wherein an entry is hit twice by entry hits.

As shown in FIGS. 3 and 4, the definitions such as an "old reference bit OLR" and a "current reference bit CRR" for the first and second reference bits RA and RB are switched based on the generation alternation signal generated by the interval timer 3. Specifically, the internal status value of the first reference bit RA stored in the first reference bit storage unit 37 is defined as the "old reference bit OLR," and the internal status of the second reference bit RB stored in the second reference bit storage unit 38 is defined as the "current reference bit CRR" for a certain period. Then, for the next period, the internal status value of the first reference bit RA is redefined as the "current reference bit CRR" and the internal status of the second reference bit RB is redefined as the "old reference bit OLR." This operation is repeated.

(Control Algorithm for First Reference Bit RA/Second Reference Bit RB)

A description will be given of a control algorithm for the first and second reference bits RA and RB with reference to FIGS. 2 and 3. FIG. 3 schematically shows transition of the internal status value of the first reference bit RA stored in the first reference bit storage unit 37 and the internal status value of the second reference bit RB stored in the second reference bit storage unit 38, by the generation alternation signal IS generated from the interval timer 3. In an initial status, the first reference bit RA is represented by CRR which means the "current reference bit," and the second reference bit RB is represented as ORR which means the "old reference bit OLR." The internal status values represented by these names are switched by using the generation alternation signal IS of FIG. 2 as a trigger signal. Specifically, the status could change as follows: when the generation alternation signal IS is sent, the internal status value of the first reference bit RA changes from the current reference bit CRR to the old reference bit OLR. The next time the generation interchange signal IS is sent, the internal status value of the first reference bit RA changes from the old reference bit OLR to the current reference bit CRR.

As shown in FIG. 3, when the generation alternation signal IS is sent, the internal status value of the second reference bit RB changes from the old reference bit OLR to the current reference bit CRR. The next time the generation alternation signal IS is sent, the internal status value of the second reference bit RB changes from the current reference bit CRR to the old reference bit OLR. In FIG. 3, the generation alternation signal IS is generated for each period TI of the interval timer 3. The reference bit R stored in each reference bit storage unit 31 is a flag which includes whether the corresponding entry of the cache memory 8 is hit (a state wherein the entry is referenced and the contents of the cache memory 8 is used). As shown in FIG. 2, when the cache memory 8 is accessed and the hit detection circuit 5 determines that a "certain entry" of the cache memory 8 is hit, by comparing the cache address information CA and the processor cache access address information (address value) PA, the hit detection circuit 5 generates the hit signal HT. The reference bit R stored in the reference bit storage unit 31 of the hit entry is set to 1. In this case, a bit set to 1 must be the reference bit R defined as "current reference bit CRR." In this state, a bit of the reference bit R defined as the "old reference bit OLR" holds the hit information of a time period for a previous hit generation. When the internal status of the bit of the reference bit R that is the old reference bit OLR is changed to the current reference bit CRR status, the content thereof is simultaneously reset to 0. When the internal status of the bit of the reference bit R that is the current reference bit CRR is changed to the old reference bit OLR, there is no change and the same bit continues to hold the recorded hit information.

FIG. 4 shows a change of the status of the first and second reference bits RA and RB, from which the selected reference bit RS, stored in the selected reference bit storage unit 32, is generated along a time axis, and shows the change of the contents thereof. As mentioned previously, the first and second reference bits RA and RB are information retained in the first and second reference bit storage units 37 and 38 in the use status storage unit 2, respectively. FIG. 3 shows an example in which the entry is hit twice after a reset timing TR. Specifically, FIG. 4 shows how the internal status of the first and second reference bits RA and RB is changed by two hit signals as shown by entry hits Hit1 and Hit2 in FIG. 4. Immediately after the reset timing TR, the internal status value of the first reference bit RA is the current reference bit CRR, and the internal status value of the second reference bit RB is the old reference bit OLR. The internal status values of the first and second reference bits RA and RB are initialized to 0. In such a state, first, when the first entry hit Hit1 is received, the internal status value of the first reference bit RA, which is the current reference bit CRR, is set to "1" from "0" as shown by A in FIG. 4. The interval status of the second reference bit RB retains the status "0," which is the internal resetting status value. When the period TI of the interval timer 3 ends and the next generation alternation signal IS is received, the internal status value of the first reference bit RA is changed from the current reference bit CRR to the old reference bit OLR, and the internal status value of the second reference bit RB is changed from the old reference bit OLR to the current reference bit CRR. The first reference bit RA maintains the recorded status of "1", to include that the entry has been hit, and the status thereof is not changed until the internal status of the first reference bit RA becomes the current reference bit CRR.

Since the internal status value of the second reference bit RB stored in the second reference bit storage unit 38 is changed from the old reference bit OLR to the current reference bit CRR, the internal status value thereof is reset to "0" at the moment of the change. However, as shown by B in FIG. 4, since the internal status value of the second reference bit RB of the last generation is "0," the second reference bit RB does not change the status value of "0" until the next hit signal is received.

When the entry hit Hit2 is received, since the internal status of the second reference bit RB is the current reference bit CRR, as shown by C of FIG. 4, the internal status value of the second reference bit RB is set to "1" from "0."

In this example, even if a plurality of hits are received, when the internal status value of the first reference bit RA or the internal status value of the second reference bit RB that is the current reference bit CRR is "1," the internal status value is kept at "1" without change. If information of the frequency of hits is required, the method of using the first and second reference bits RA and RB storing the use status (used (hit)/unused (miss)) of each entry for certain past and current periods is not employed, instead the above described saturated counter is employed.

When the next generation alternation signal IS is received, as shown by D in FIG. 4, the internal status value of the first reference bit RA that had been the old reference bit OLR is changed to the current reference bit CRR. Accordingly, the internal status value of the first reference bit RA is cleared to "0" from "1" at the time of the change.

Figure 5:
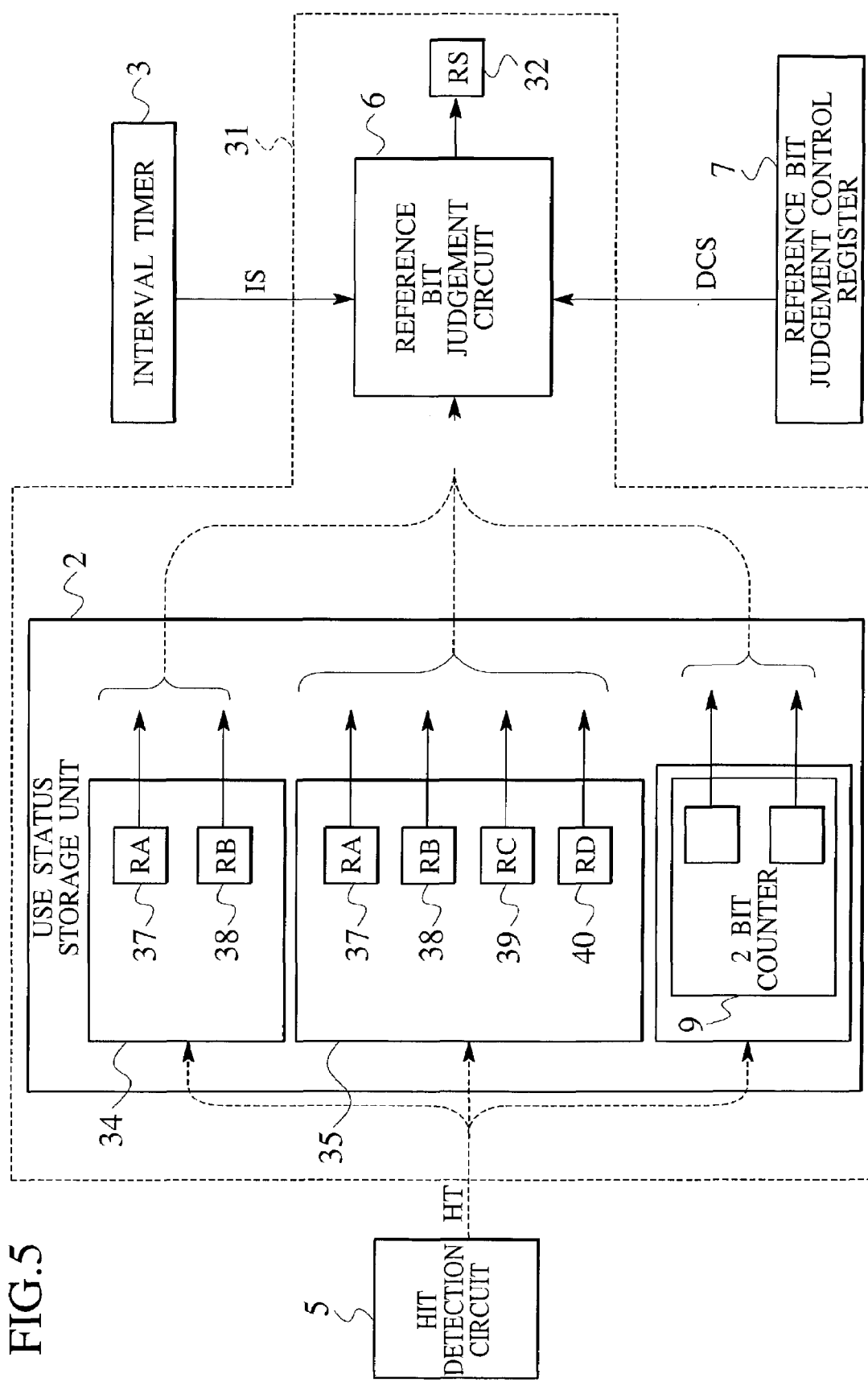
FIG. 5 is a block diagram of a reference bit judgement circuit and peripheral circuits thereof that constitute the cache memory system according to the first embodiment of the present invention, which shows an example wherein a use status storage unit includes a 2-bit register, a 4-bit register and a 2-bit counter.

FIG. 5 shows only the reference bit judgement circuit 6, the hit detection circuit 5, the use status storage unit 2, the interval timer 3, a reference bit judgement control register 7, and the selected reference bit storage unit 32 storing the selected reference bit RS, which constitute the cache memory system 50 according to the first embodiment of the present invention. The area of the drawings surrounded by a dotted line corresponds to the reference bit storage unit 31 shown in FIG. 2.

Figure 6:
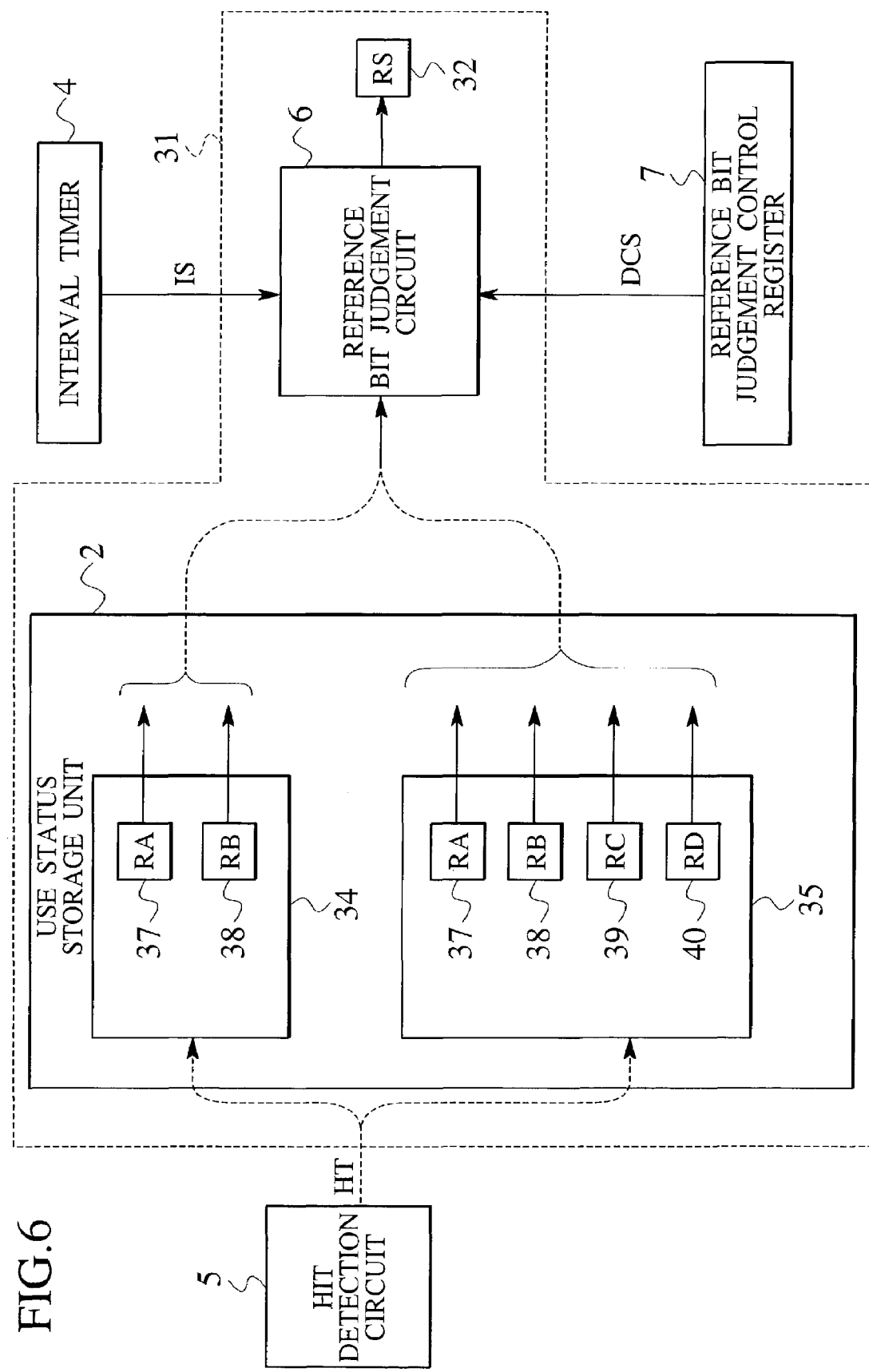
FIG. 6 shows another example wherein the use status storage unit includes the 2-bit register and the 4-bit register.
Figure 7:
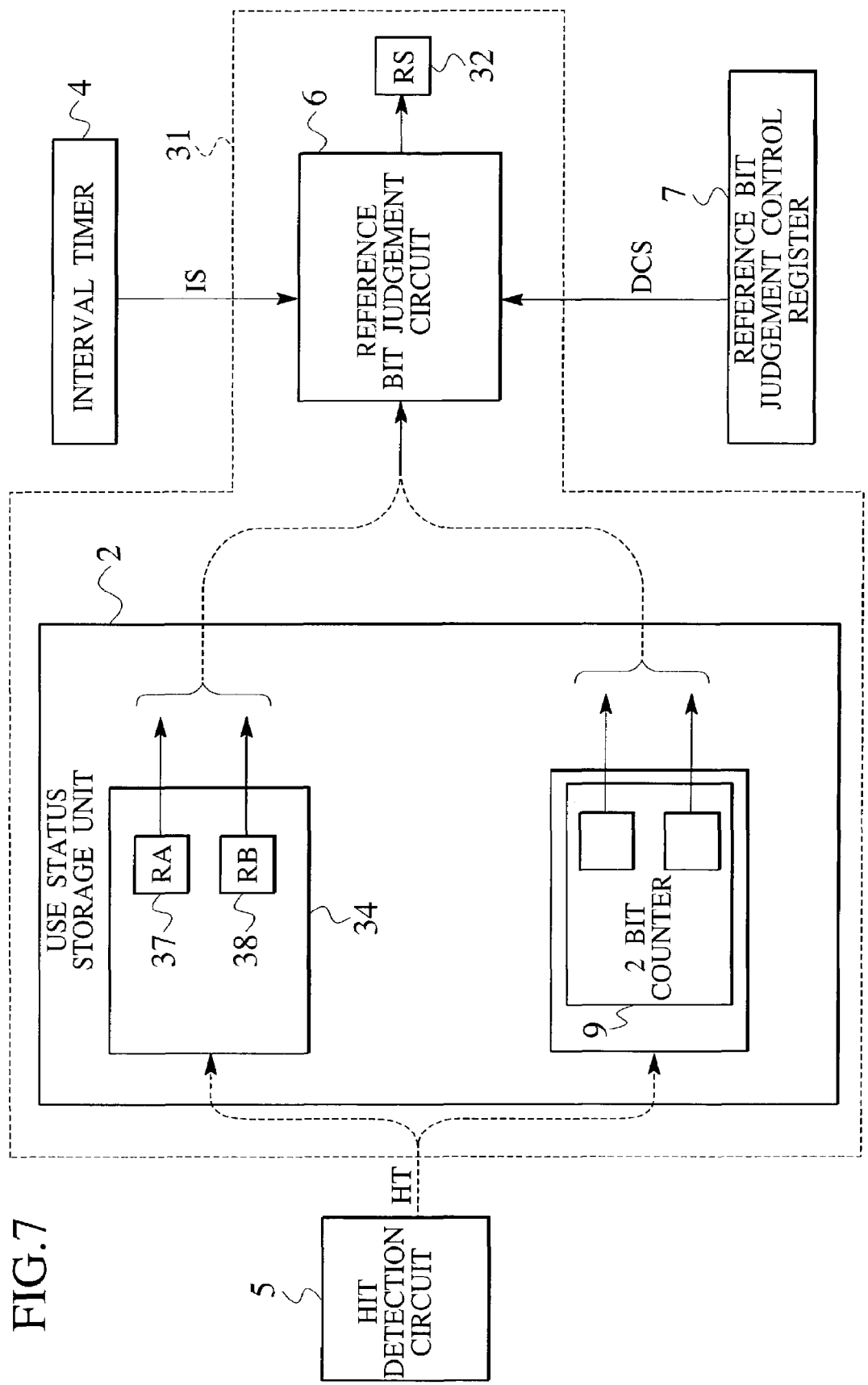
FIG. 7 shows one another example wherein the use status storage unit includes the 2-bit register and the 2-bit counter.
Figure 8:
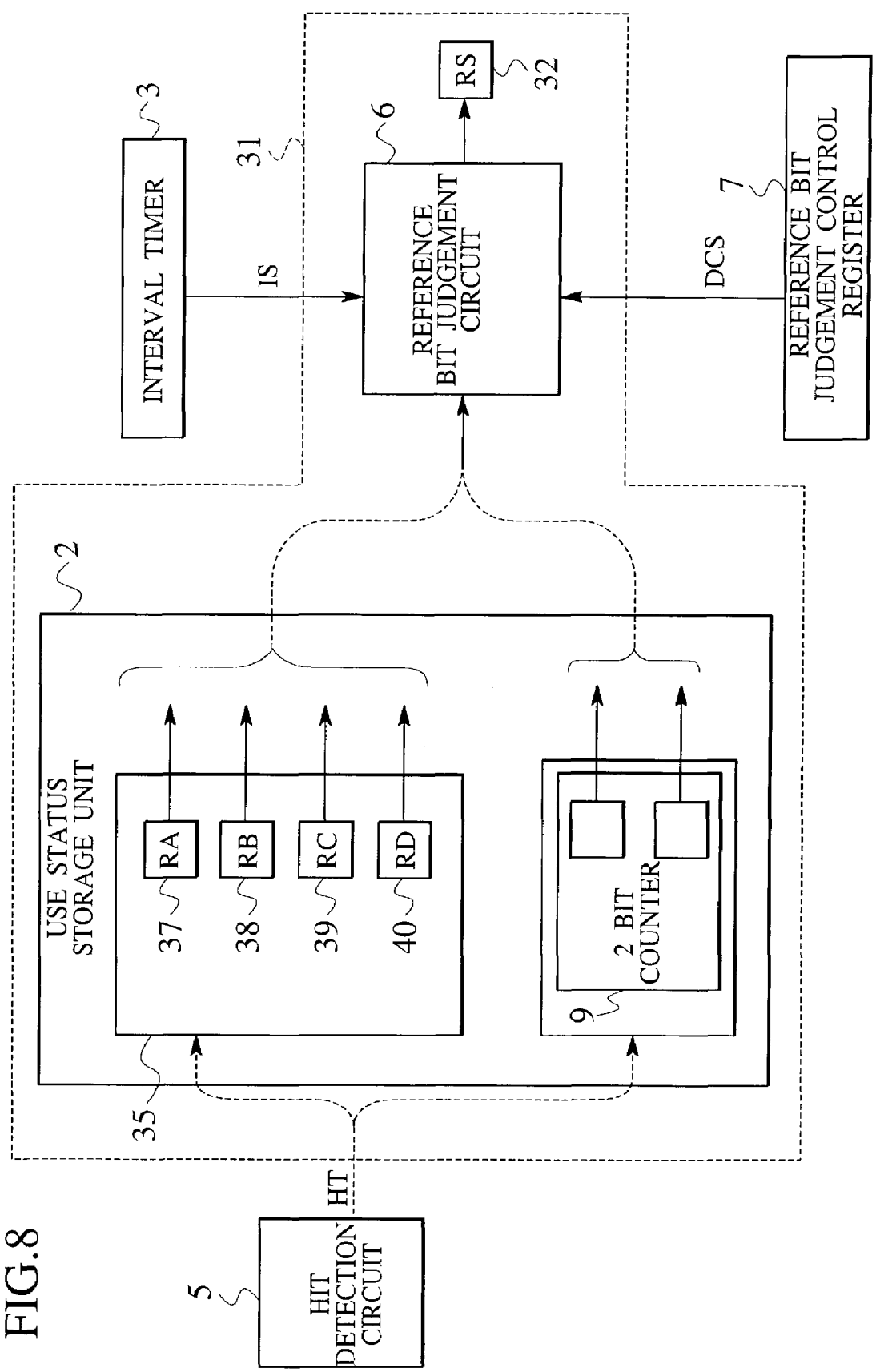
FIG. 8 shows another example wherein the use status storage unit includes the 4-bit register and the 2-bit counter.

The use status storage unit 2 that generates the selected reference bit RS stored in the selected reference bit storage unit 32, various devices can be employed. For example, the cache memory system in FIG. 5 includes the use status storage unit 2 that is a 2-bit register 34, a 4-bit register 35 and a 2-bit counter 9. The 2-bit register 34 includes the first and second reference bit storage units 37 and 38. The 4-bit register 35 includes the first reference bit storage unit 37, the second reference bit storage unit 38, a third reference bit storage unit 39, and a fourth reference bit storage unit 40. The reference bit judgement control register 7 for software selection register for setting the determination algorithm that determines the conditions for setting the internal status value of the selected reference bit RS stored in the selection reference bit storage unit 32 to "1" and "0" by filtering the information of the use status storage unit 2. FIG. 6 shows an example of use status storage unit 2 composed of the 2-bit register 34 and the 4-bit register 35. FIG. 7 shows an example of use status storage unit 2 composed of the 2-bit register 34 and the 2-bit counter 9. FIG. 8 shows an example of use status storage unit 2 composed of the 4-bit register 35 and the 2-bit counter 9. In FIGS. 6 to 8, the constitution of the other parts is the same as that of FIG. 5. Note that an n-bit register (n: natural number) or an n-bit counter may be used instead of the above described 2-bit register 34 or the 2-bit counter 9. In such case, the n-bit register includes, as a matter of course, n reference bit storage units, or the n-bit counter includes a counter composed of n bits. Since at least two bits are required to judge the history, the 2-bit register 34 is disclosed in FIG. 5. Also in FIGS. 6 to 8, the area surrounded by a dotted line corresponds to the reference bit storage unit 31 shown in FIG. 2.

(Reference Bit Determining Function and Random Entry Specifying Function)

A description will be given of a method for generating and a determination function of each selected reference bit RS, using the information of the first and second reference bits RA and RB respectively stored in the first and second reference bit storage units 37 and 38. The selected reference bit RS indicates whether the corresponding entry is referenced in a certain generation. Furthermore, a description will be given of the method of randomly selecting an entry to be updated.

As shown in FIG. 2, in the reference bit storage unit 31 for each of the entries 0, 1, 2 . . . , n−2, and n−1 of the cache memory 8, the internal status of the first and second reference bits RA and RB, which exist respectively in the first and second reference bit storage units 37 and 38 in the use status storage unit 2, is controlled by the generation alternation signal IS generated from the interval timer 3. The generation alternation signal IS is also sent to the reference bit judgement circuit 6 from the interval timer 3. In the reference bit judgement circuit 6, the internal status values of the first and second reference bits RA and RB are precisely known, and it can be recognized which of the first reference bit RA and the second reference bit RB is the current reference bit CRR or the old reference bit OLR.

In the reference bit judgement circuit 6, the final information value of the selected reference bit RS is determined by the hit status of the "old reference bit OLR" and the "current reference bit CRR" for each of the entries 0, 1, 2 . . . , n−2, and n−1. More specifically, as shown in FIGS. 5 to 8, the algorithm which generates the reference bit can be selected by a judgement control signal DCS transmitted from the reference bit judgement control register 7 to the reference bit judgement circuit 6.

For example, the internal status value of the selected reference bit RS is determined by only the information corresponding to the current reference bit CRR (current generation) from among the old reference bit OLR and the current reference bit CRR. Alternatively, the internal status value of the selected reference bit RS is determined by considering two-generation information of the entry hits Hit1 and Hit2 by taking a logic sum (OR) of the values of the old reference bit OLR (last generation) and the current reference bit CRR (current generation). The reference bit judgement circuit 6 receives not only the signal from the 2-bit register 34 composed of the first and second reference bit storage units 37 and 38, but also the signal from the 4-bit register 35. Further, the signal from the n-bit counter can be sent to the reference bit judgement circuit 6. The information of the selected reference bit RS can be determined by examining the past hit status in more detail. As previously mentioned, the status value of the selected reference bit RS can be determined according to the number of times that the entry is hit, which is recorded by the saturated counter. Selection of the method largely depends on the operating frequency of the circuit.

The entry having an internal status value, of the reference bit R stored in the reference bit storage unit 31, of "0" is selected based on the internal status value of the selected reference bit RS that is thus generated and stored in the selected reference bit storage unit 32. Since there is unlikely to be only one entry having an internal status value of "0," among a plurality of the reference bits R, a method of randomly selecting an entry from the entries having an internal status of "0" is shown.

A description will be given of a case where the cache memory 8 has 64 entries as an example. In FIG. 9, the area surrounded by a dotted line corresponds to the cache memory 8. As shown in FIG. 9, these entries are divided into eight segments, for example. Specifically, a segment 0 includes the entries 0, 1, 2, 3, 4, 5, 6, and 7. A segment 1 includes the entries 8, 9, 10, 11, 12, 13, 14, and 15. Similarly, a segment 6 includes the entries 48, 49, 50, 51, 52, 53, 54, and 55. A segment 7 includes the entries 56, 57, 58, 59, 60, 61, 62 and 63. Each divided segment is considered as one segment since the entries are divided such that one segment includes eight entries, and each segment includes eight reference bit storage units 31. Corresponding to the eight reference bit storage units 31, there are eight signals indicating the internal status values of the reference bits R. Note that, in FIG. 9, an example of the cache memory 8 with 64 entries is shown, but the number of entries may be 32, 48, 128, 256, and so on. The number of entries in one segment is not limited to eight.

[Entry Shuffle]

Figure 10:
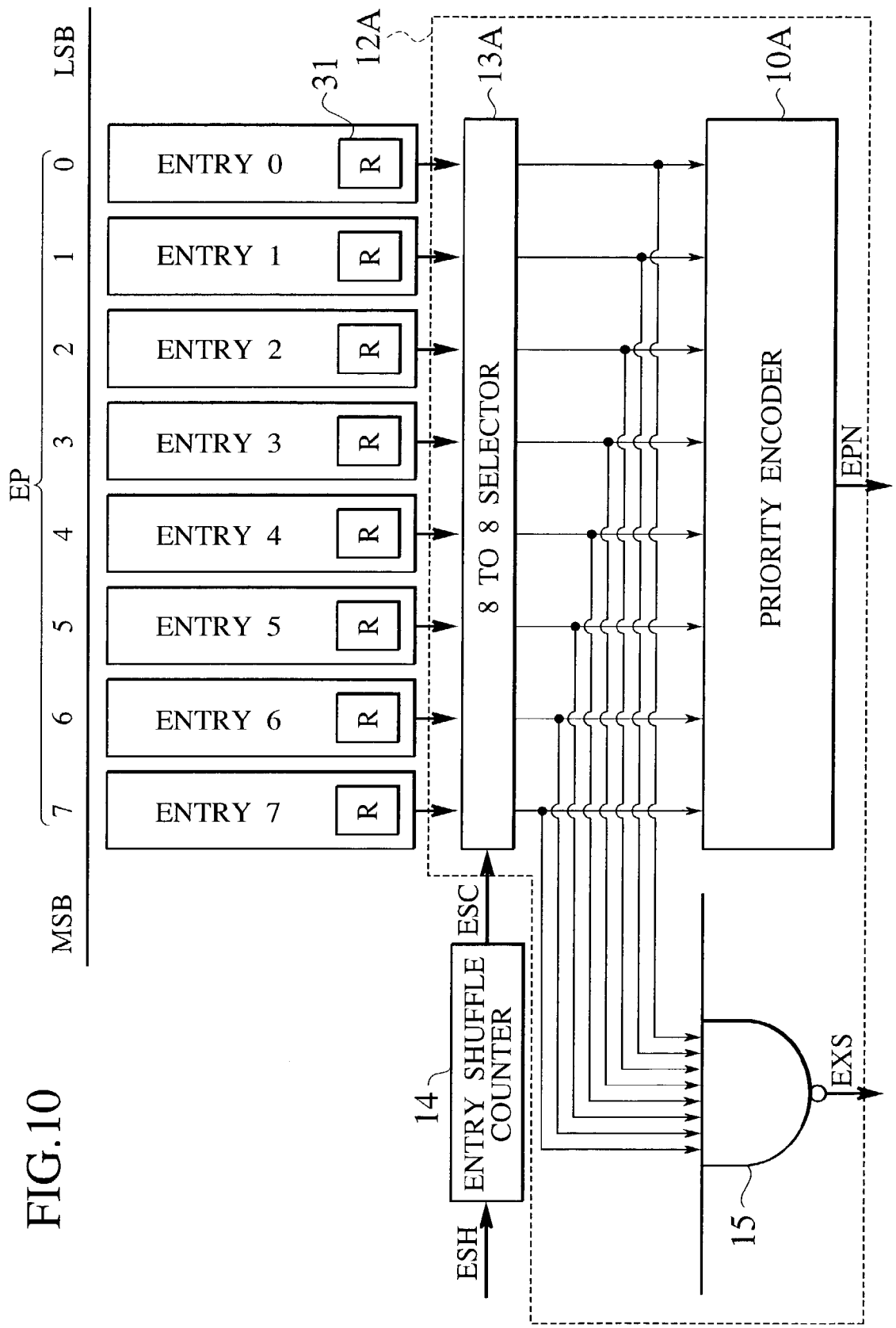
FIG. 10 is a block diagram schematically showing hardware in a segment constituting the cache memory in the cache memory system according to the first embodiment of the present invention.

In the cache memory system 50 according to the first embodiment of the present invention, as shown in FIG. 10, an arrangement for implementing entry shuffle of the cache memory 8 includes the segments, each comprising i entries, the reference bit storage units 31, an 8 to 8 selector 13A, a priority encoder 10A, a NAND gate 15, and an entry shuffle counter 14. The respective reference bit storage units 31 include the respective i reference bits R accompanying the respective i entries. The 8 to 8 selector 13A receives output signals from the i reference bit storage units 31. The priority encoder 10A receives i output signals from the 8 to 8 selector 13A and generates a selected entry position number EPN. The NAND gate 15 receives the i output signals from the 8 to 8 selector 13A in a branching manner and generates an unused entry presence signal EXS. The entry shuffle counter 14 receives an entry shuffle signal ESH and generates an entry selector control signal ESC to the 8 to 8 selector 13A. In FIG. 10, the area surrounded by a dotted line, which includes the 8 to 8 selector 13A, the priority encoder 10A, and the NAND gate 15, corresponds to the processing circuit 12A.

As shown in FIG. 10, each segment is composed of the entries 0, 1, 2, 3, 4, 5, 6, and 7, which are arranged corresponding to entry position numbers EP from an LSB side to an MSB side. The reference bit storage units 31 store the reference bits R contained in the respective eight entries. The 8 to 8 selector 13A, the entry shuffle counter 14, the priority encoder 10A, and the NAND gate 15 constitute additional hardware. A description will be given based on the premise that each segment includes 8 entries as shown in FIG. 10. The internal status values of the respective reference bits R stored in the reference bit storage units 31 for the respective entries are sent to the 8 to 8 selector 13A. The 8 to 8 selector 13A is used for entry shuffle in each segment. Specifically, after an entry in the segment is finally selected as a target to be updated and then updated, the entry shuffle is performed. The 8 to 8 selector 13A includes eight inputs and eight outputs, and the inputs and the outputs are connected to correspond to each other on a one-to-one basis. The 8 to 8 selector 13A is controlled by the entry selector control signal ESC supplied from the entry shuffle counter 14. The entry shuffle counter 14 functions as a backward counter. When the above described entry shuffle is performed, the entry shuffle counter 14 changes an output status value upon receiving the entry shuffle signal ESH.

Giving a specific example, the output status value of the entry shuffle counter 14 comprises a three bit signal. The 8 to 8 selector 13A is switched in accordance with eight combinations of three bits of the signal. The output status value of the entry shuffle counter 14 indicates, for example, a value equal to the position where the entry 0 is located. Specifically, when the entry 0 is located at the position of the entry position number EP=0, the output status value of the entry shuffle counter 14 is 0. When the entry 0 is located at the position of the entry position number EP=6, the output status value of the entry shuffle counter 14 is 6. When the output status value of the entry shuffle counter 14 is determined, the positions where the entries, other than the entry 0, are connected are determined.

As shown in FIG. 10, the signals indicating the internal status values of the reference bits R of the respective entries, which are passed through the 8 to 8 selector 13A, are divided and transmitted to the NAND gate 15 and the priority encoder 10A. The NAND gate 15 is a circuit for generating the unused entry presence signal EXS indicating whether there is an entry that is not hit in the segment. When at least one of the internal status values of the reference bits R stored in the reference bit storage units 31 is "0," the information of the unused entry presence signal EXS is "1," which indicates the presence of an entry that is not hit. The priority encoder 10A is a circuit that selects the entries having internal status values of the reference bits R as "0" and generates the position number of the entry that is closest to the MSB side, from among the selected entries, as the selected entry position number EPN. The selected entry position number EPN does not indicate the number of the entry itself but the position where the entry is located. Next, a description will be given for the eight segments as a whole by putting together the segments as described above.

As shown in FIG. 10, in each segment, the selected entry position number EPN indicating the position of the entry that is not hit, which can be a target to be replaced, is always generated for each segment while the internal status value of the reference bit R stored in the reference bit storage unit 31 for each entry. Moreover, the unused entry presence signal EXS indicating whether there is an entry that is not hit in the segment is generated.

Figure 11:
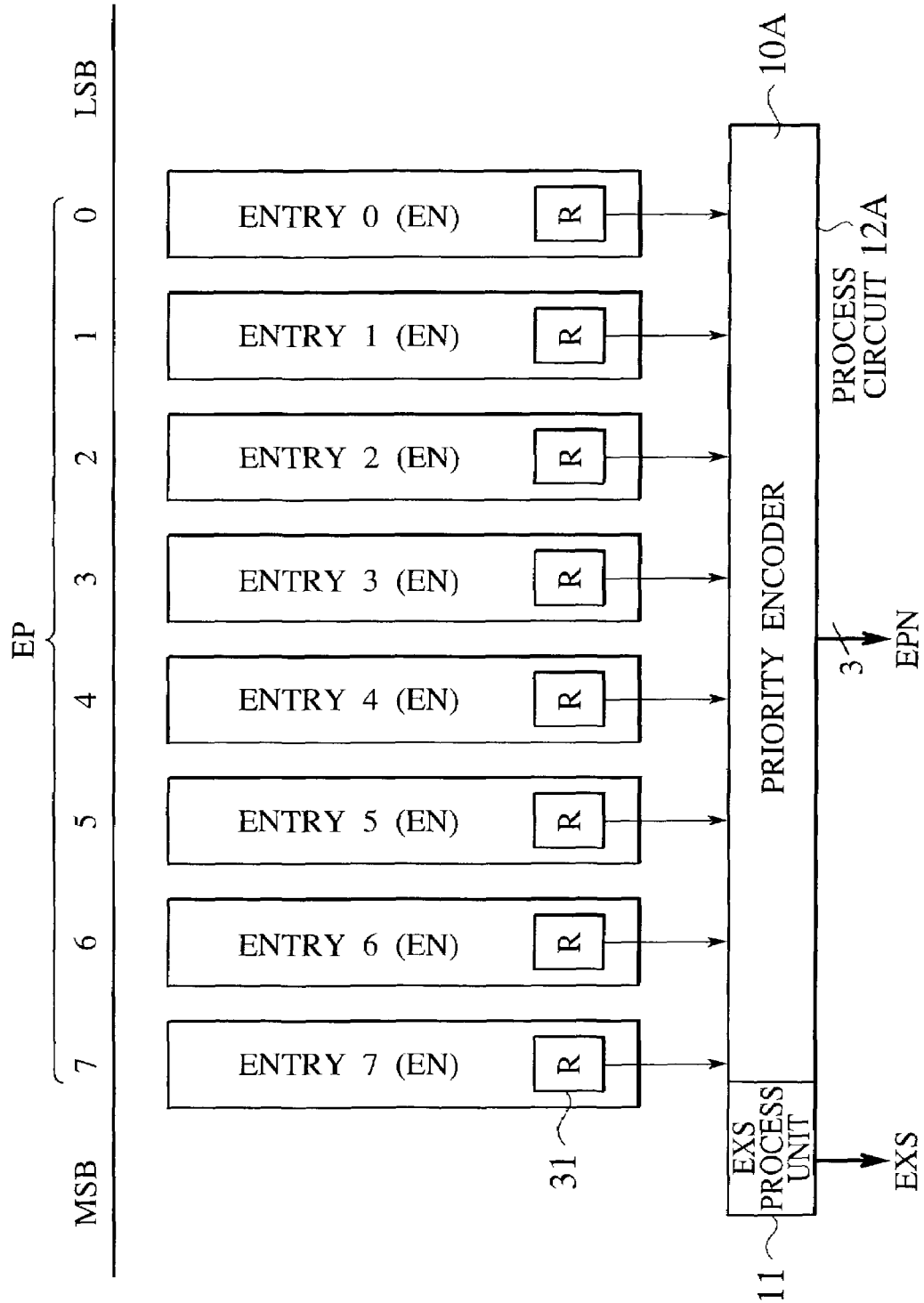
FIG. 11 is a schematic diagram showing processing in a segment 0, which illustrates the status before rotation of entry shuffle in a segment to be updated.

A summary of the processing in the segment 0 is as follows. As shown in FIG. 11, each of Entry 0, Entry 1, Entry 2, Entry 3, Entry 4, Entry 5, Entry 6, and Entry 7 is indicated by an entry number EN and corresponds to each entry position number EP between the LSB (Least Significant Bit) and the MSB (Most Significant Bit). Each entry includes the reference bit R stored in the reference bit storage unit 31, and the output from the reference bit R is sent to the processing circuit 12A. The processing circuit 12A is composed of the priority encoder 10A and the EXS processing unit 11. The three bit output of the priority encoder 10A indicates the selected entry position number EPN, and the output of the EXS processing unit 11 indicates the unused entry presence signal EXS.

As shown in FIG. 11, the 8 bit-signal indicating the internal status values of the reference bits R of the respective entries is passed through the priority encoder 10A to encode the selected entry position number EPN. The entry position number is the position number of the entry that is closest to the left end (referred to as the MSB side) from among the entries having internal status values "0" of the reference bits. The selected entry position number EPN in this case is information (a number) indicating the position where the entry is located in the segment, but not the number of the entry itself.

In the segment 0, the signal indicates the presence of the entry whose internal status value is "0". In other words, the signal indicated by the unused entry presence signal EXS is also generated. The unused entry presence signal EXS is an output resulting from sending signal information of the internal status values of all the reference bits R stored in the reference bit storage units 31, in each segment, to the NAND gate 15 (FIG. 10).

For example, in the schematic view showing the processing in the segment 0 of FIG. 11, when the internal status values of the reference bits R of the entries [7:0] are "11011011" (binary) from the upper side, the internal status values of the reference bits R of the entries 5 and 2 are "0." Accordingly, since these two entries are not hit, the entries become targets to be updated. Thus, the selected entry position number EPN, which is the output of the priority encoder 10A is "101", which is the position number "5".

The entry 5 (the position information corresponds to the number of the entry itself) is offered from the segment 0 as a candidate target to be updated. Here, the unused entry presence signal EXS becomes "1."

Figure 12:
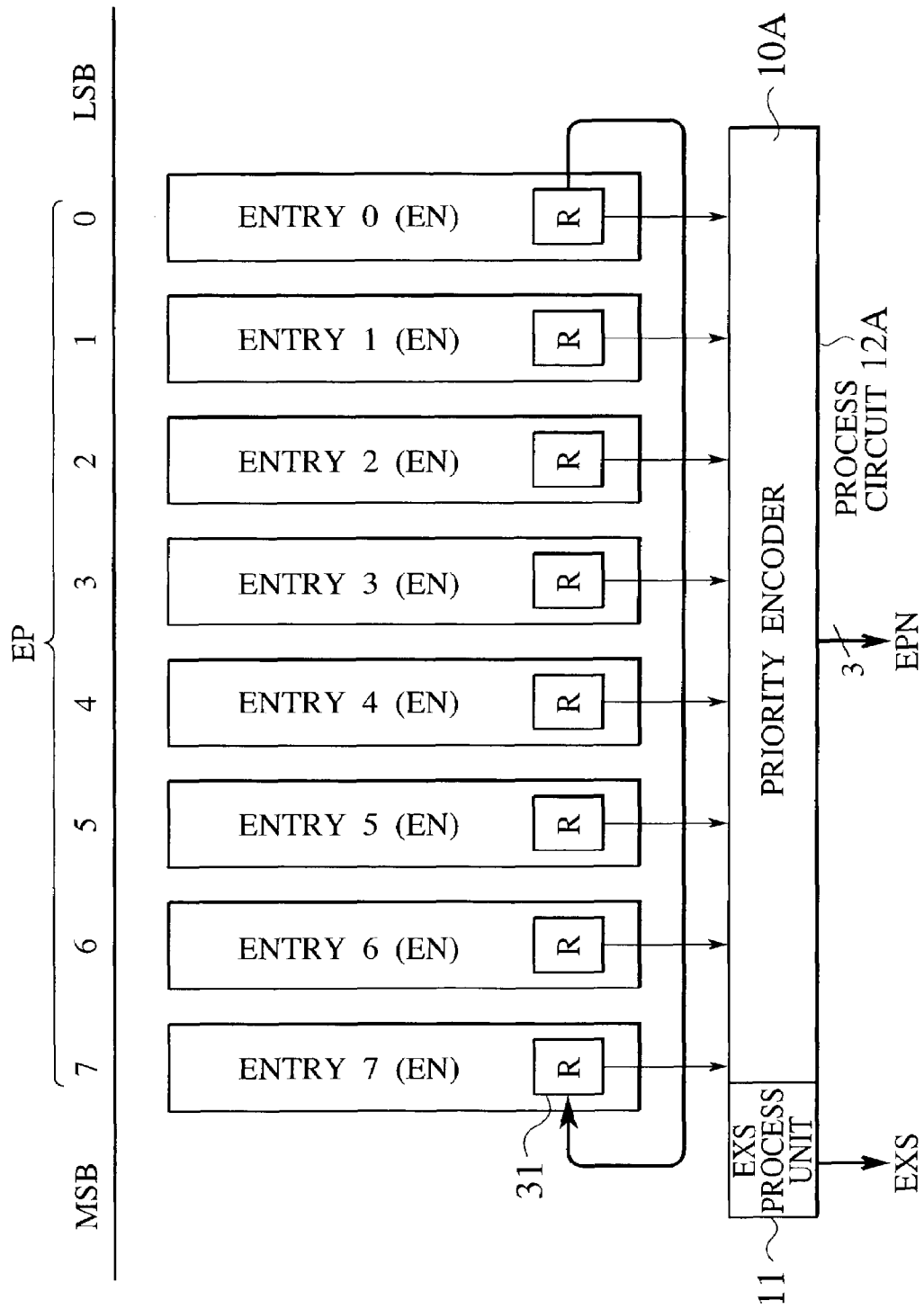
FIG. 12 is a schematic diagram illustrating the status of the rotation of the entry shuffle in the segment to be updated.

Other segments could be considered, but the description will be continued focusing on the segment 0. When the entry belonging to the segment 0 is finally selected as an entry for updating, as shown in FIG. 12, the entry (entry 0 in this example) on the LSB side, which has the smallest position number (entry position number EP=0), is shifted to the position of the entry (entry 7 in this example) on the MSB side, which has the largest position number (entry position number EP=7). Accordingly, as shown in FIG. 13, the entry 0 is shifted to the MSB side, the entry 7, the entry 6, the entry 5, the entry 4, the entry 3, the entry 2, and the entry 1 are sequentially shifted, and the entry 1 is arranged on the LSB side. The reason for shifting the entry 0 on the LSB side to the entry 7 position on the MSB side is to prevent the tendency of the entries with the larger entry numbers from being updated by the priority encoder 10A that is used for the selection of the entry. For such a reason, the entry on the LSB side is shifted to the MSB side. FIGS. 12 and 13 illustrate the manner of executing the entry shuffle in the segment to be updated. In the description of FIGS. 11 to 13, with regard to the MSB side, an example is disclosed of shifting the entry on the LSB side to the MSB side, but with regards to the LSB side, the entry on the MSB side may be shifted to the LSB side. Moreover, the EXS processing unit 11 may be set, not only on the MSB side, but also on the LSB side, and the unused entry presence signal EXS may be generated on the LSB side.

In the entry shuffle method of the cache memory 8 according to the present invention, (a) a cache memory including a plurality of segments, each comprising a plurality of entries as a unit, includes the steps of (b) sending the reference bit accompanied with each entry to the processing unit from the reference bit storage unit, and (c) performing the entry shuffle by repeating the step of rotating the plurality of entries and generating the selected entry position number and the unused entry presence signal.

[Segment Shuffle]

In the cache memory system 50 according to the first embodiment of the present invention, as shown in FIG. 14, an arrangement implementing segment shuffle of the cache memory 8 includes j segments, the unused entry presence signal (EXS) storage units 33, an 8 to 8 selector 13B, a priority encoder 10B, an OR gate 17 and a segment shuffle counter 16. The EXS storage units 33 include respective j unused entry presence signals EXS with the respective j segments. The 8 to 8 selector 13B receives the j unused entry presence signals. The priority encoder 10B receives j output signals from the 8 to 8 selector 13B and generates a selected segment position number SPN. The OR gate 17 receives the branched j unused entry presence signals and generates an unit entry presence signal V. The segment shuffle counter 16 receives a segment shuffle signal SSH and generates a segment selector control signal SSC to the 8 to 8 selector 13B. In FIG. 14, the area surrounded by a dotted line, including the 8 to 8 selector 13B, the priority encoder 10B, and the OR gate 17, corresponds to the processing circuit 12B.

Figure 15:
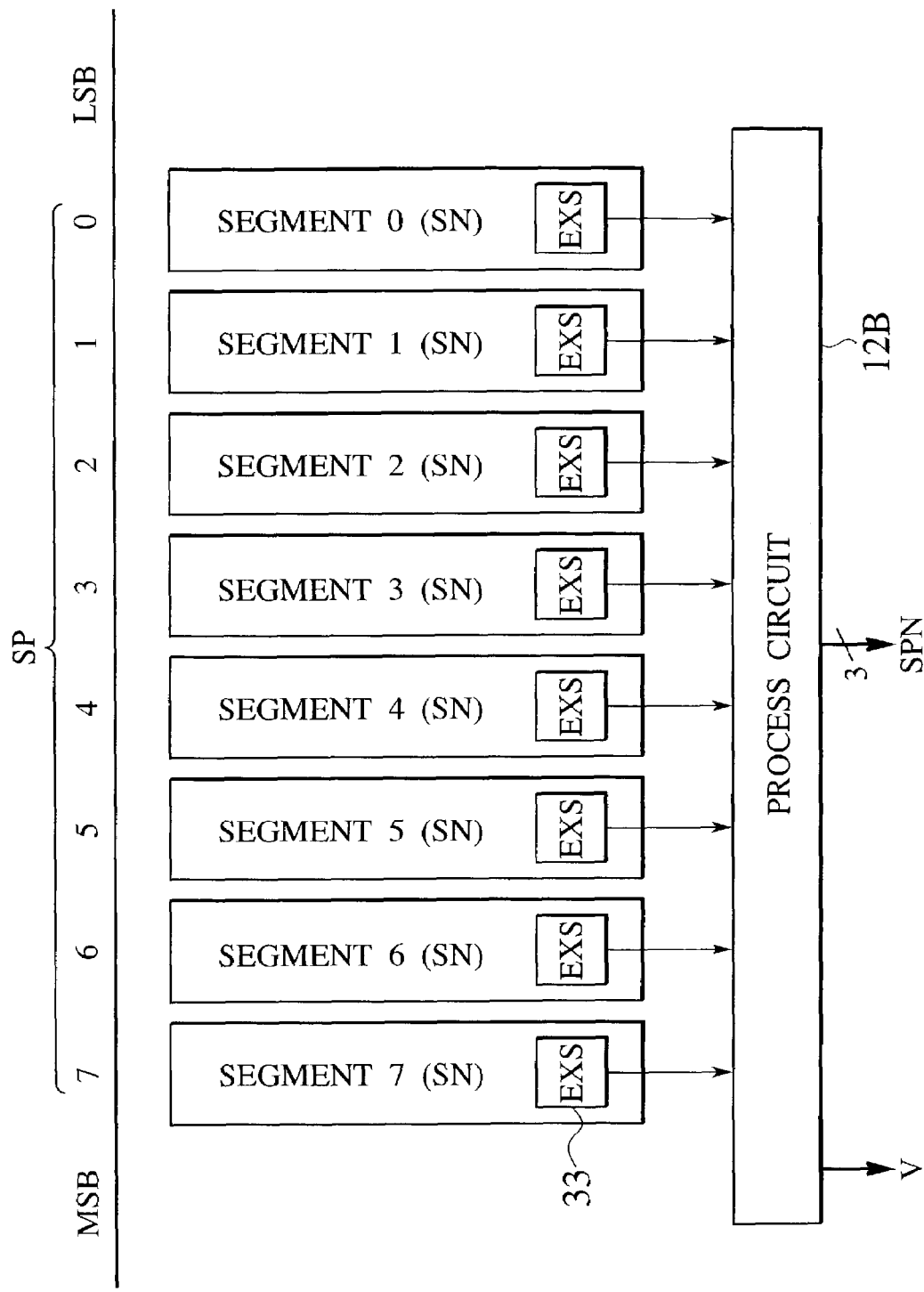
FIG. 15 is a schematic diagram showing the entire segment-processing, which illustrates the status before the rotation.
Figure 16:
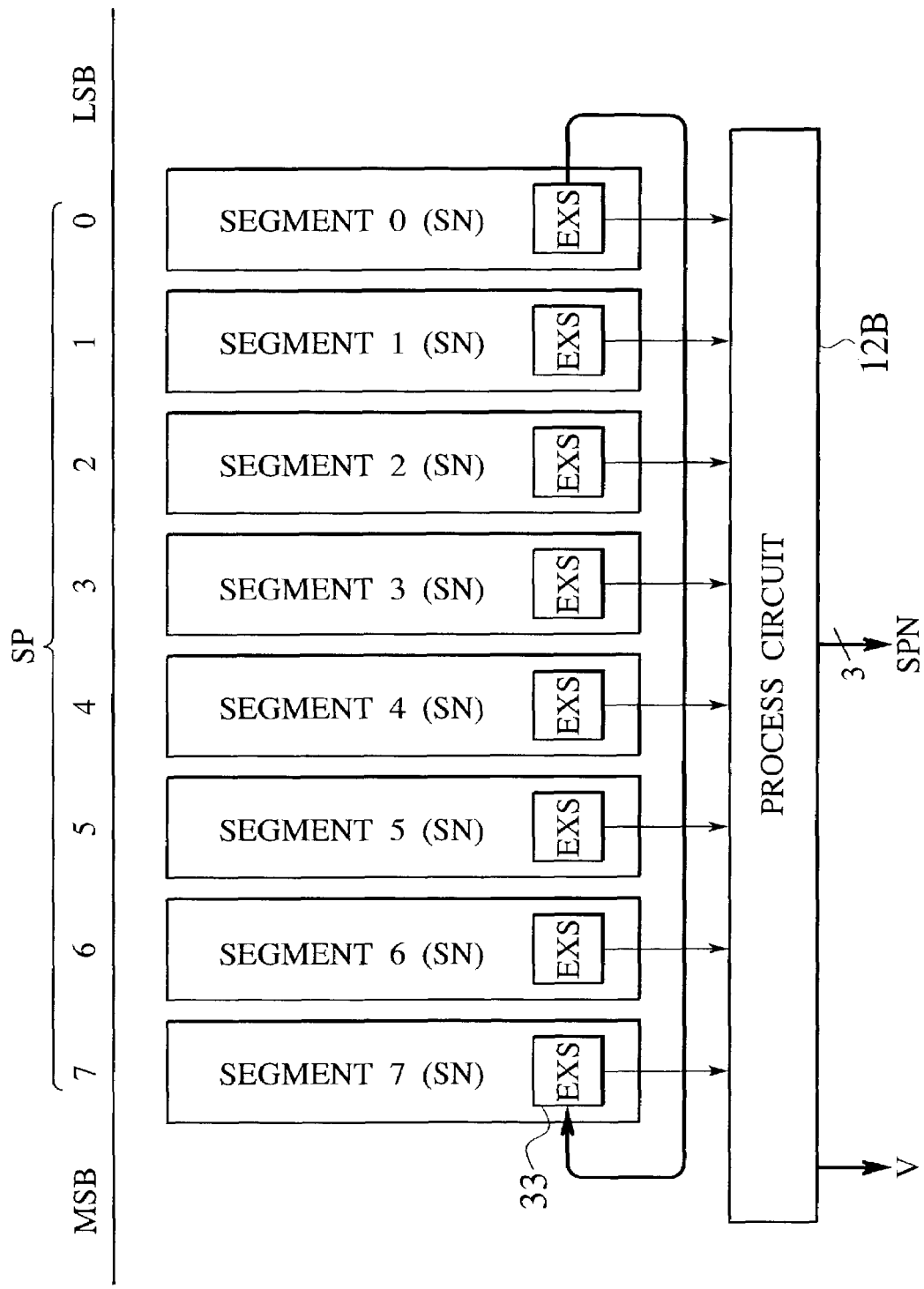
FIG. 16 is a schematic diagram illustrating the status of the rotation in the entire segment processing.
Figure 17:
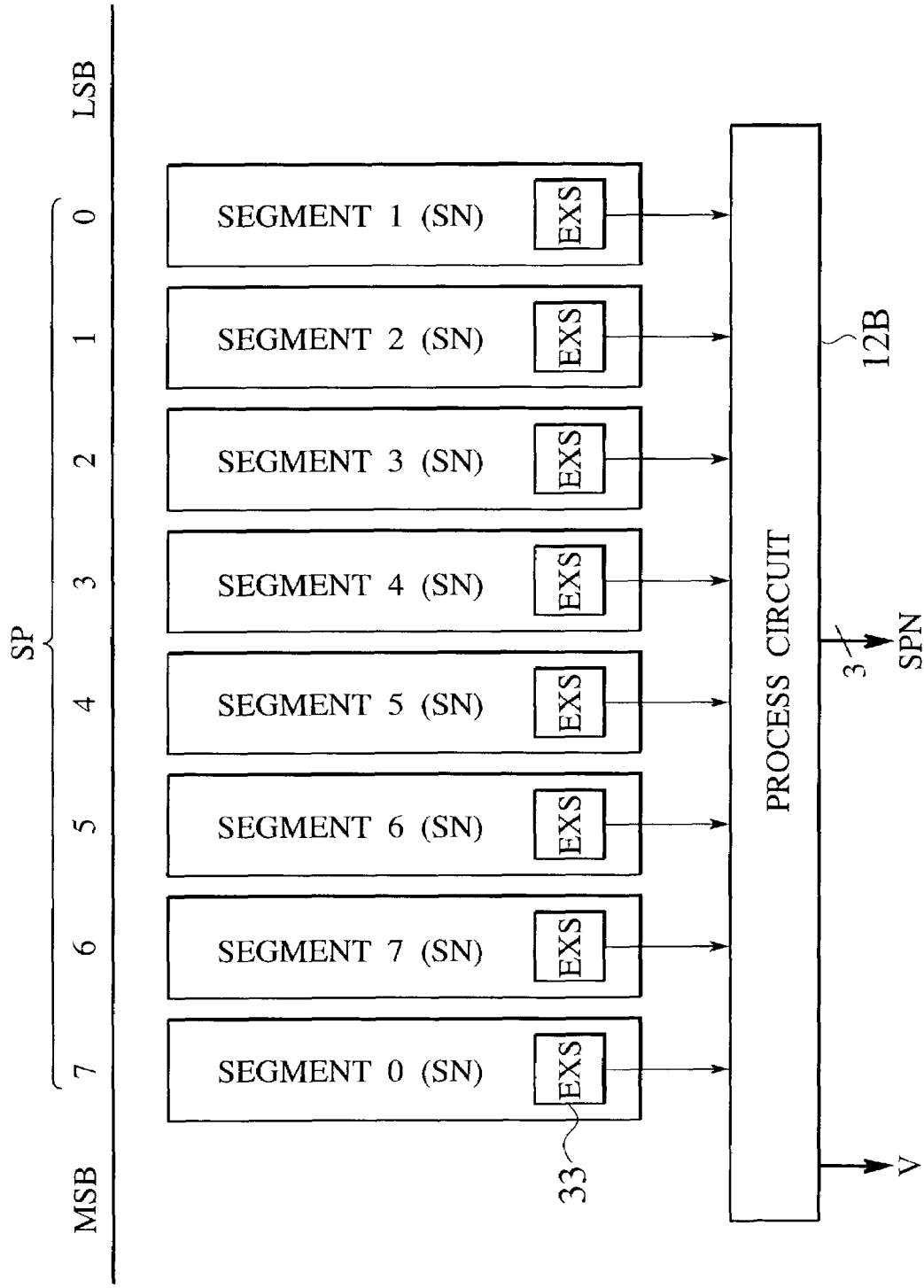
FIG. 17 is a schematic diagram illustrating the status after the rotation in the entire segment processing.

Next, a description will be given of the segment shuffle with reference to FIGS. 15 to 17. As for the relationship between one segment and the other seven segments in the segment shuffle, similar to the case of the entry shuffle, the segments are processed by the processing circuit 12B, the priority encoder 10B and the rotation function in the processing circuit 12B.

The reference storage units 31 storing the reference bits of the respective entries in the entry shuffle are replaced by the EXS storage units 33, storing the unused entry presence signals EXS generated from the respective segments in the segment shuffle. In other words, selection of the segment including the updatable entry is intended to be made by sending the unused entry presence signals EXS of the respective segments to the priority encoder 10B of the processing circuit 12B. Herein, the segment including the target entry to be updated is selected based on information of the selected segment position number SPN that indicates the position where the selected segment is located, and then the entry to be updated is finally selected. The unit entry presence signal V in FIG. 15 is a signal indicating the presence of at least one entry selected for updating from among all of the entries. Herein, when the unit entry presence signal V does not represent a valid signal, there is no unused (unit) entry. Accordingly, the entry to be updated is actually randomly selected.

When the segment including the entry to be updated is selected, similar to the entry shuffle in segments, rotation processing of the segments is performed. The reason for the rotation processing is the same as that in the entry shuffle. Specifically, as shown in FIG. 16, the segment (segment 0 in this example) on the LSB side, which has the smallest segment position number SP (segment position number SP=0), is rotated (shifted) to the position of the segment (segment 7 in this example) on the MSB side, which has the largest segment position number (segment position number SP=7). Accordingly, as shown in FIG. 17, the segment 0 is shifted to the MSB side, the segment 7, the segment 6, the segment 5, the segment 4, the segment 3, the segment 2, and the segment 1 are sequentially shifted, and the segment 1 is arranged on the LSB side. The reason for shifting the segment 0 on the LSB side to the segment 7 on the MSB side in such a manner is to prevent the tendency of the segments with the larger segment numbers from being updated because of the priority encoder 10B (see FIG. 14) used for the selection of the segment. For such a reason, the segment (segment with the smallest position number) on the LSB side is shifted to the position of the segment (segment with the largest position number) on the MSB side. FIGS. 16 and 17 illustrate the manner of executing the segment shuffle. Thus, the shuffle is performed in two processes for preparing the next updating operation. In the description of FIGS. 15 to 17, with regard to the MSB side, discloses the example shifting the segment on the LSB side to the MSB side, but with regards to the LSB side, the segment on the MSB side may be shifted to the LSB side. Moreover, in such a case, the unit entry presence signal V may be generated on the LSB side.

The segment shuffle method of the cache memory 8 according to the present invention, is in a cache memory including a plurality of segments, each comprising a plurality of entries as a unit. The segment shuffle method includes the steps of (a) sending the reference bits of the respective entries to the processing circuit from the reference bit storage units, and (b) performing the entry shuffle by repeating the step of rotating the plurality of entries and generating the selected entry position number and the unused entry presence signal. In addition to the entry shuffle step, the segment shuffle of the cache memory 8 includes the steps of (c) sending the unused entry presence signal of each segment to the processing circuit from the unused entry presence signal storage unit and generating the selected segment position number and the unused entry presence signal, and (d) performing the segment shuffle by repeating the step of rotating the plurality of segments and generating the selected segment position number and the unused entry presence signal.

FIG. 14 is a view showing the segments together. Specifically, as shown in FIG. 14, the entire hardware of the cache memory system according to the first embodiment of the present invention comprises eight segments containing data, the 8 to 8 selector 13B, the priority encoder 10B, the OR gate 17, and the segment shuffle counter 16. Each of the segments includes the EXS storage unit 33 and a selected entry position number (EPN) storage unit 41. The unused entry presence signals EXS stored in the respective EXS storage units 33 of the respective segments are sent to the 8 to 8 selector 13B. The 8 to 8 selector 13B is used to shuffle the segments. Specifically, after an entry contained in the segment is finally selected as a target to be updated and then updated, the segment shuffle is performed. Similar to the 8 to 8 selector 13A shown in FIG. 10, the 8 to 8 selector 13A includes eight inputs and eight outputs, and the inputs and the outputs are connected to correspond to each other, on a one-to-one basis. As shown in FIG. 14, the 8 to 8 selector 13B is controlled by a segment selector control signal SSC supplied from the dedicated segment shuffle counter 16. The segment shuffle counter 16 is different from the entry shuffle counter 14 in FIG. 10, but has a similar function as a backward counter. When the previously mentioned segment shuffle is performed, the segment shuffle counter 16 changes an output status value thereof upon receiving the segment shuffle signal SSH.

Giving a specific example, the output status value of the segment shuffle counter 16 comprises a three bit signal. The 8 to 8 selector 13B is switched in accordance with eight combinations of three bits of the signal. This point is similar to the description of the entry shuffle counter 14 and the 8 to 8 selector 13A in FIG. 10. The output status value of the segment shuffle counter 16 indicates, for example, a value equal to the position where the segment 0 is located. Specifically, when the segment 0 is located at the position of the segment position number SP=0, the output status value of the segment shuffle counter 16 is 0. When the segment 0 exists at the segment position number SP=6, the output status value of the segment shuffle counter 16 is 6. When the output status value of the segment shuffle counter 16 is determined, the positions where segments, other than the segment 0, are connected is determined. As shown in FIG. 14, each of the unused entry presence signals EXS stored in the EXS storage units 33 is divided into two signals. One signal is transmitted to the OR gate 17, and the other signal is transmitted to the 8 to 8 selector 13B.

The unused entry presence signals EXS, which have passed through the 8 to 8 selector, are transmitted to the priority encoder 10B. The unit entry presence signal V indicates that at least one segment includes an entry that is not hit. The OR gate 17 is a circuit to generate the unit entry presence signal V. When at least one of the unused entry presence signals EXS stored in the EXS storage units 33 is "1," information of the unit entry presence signal V becomes "1," which indicates the presence of the entry that is not hit.

The priority encoder 10B is a circuit that operates as follows. The priority encoder 10B selects the segments having signal status values of the unused entry presence signals EXS, which are "1", from the internal status values of the unused entry presence signals EXS stored in the respective EXS storage units 33 of the eight segments. As illustrated in FIGS. 15 to 17, the priority encoder 10B then generates the position number SP of the segment that is closest to the MSB side as the selected segment position number SPN. The segment position numbers SP are not the number of the segments themselves, but the numbers of the positions where the segments are located.

The result of the above operation provides information about the unit entry presence signal V corresponding to the information of whether there is an unused entry among all the entries and information of the selected segment position number SPN, as information of one segment selected from the segments including the unused entry.

Simultaneously, as shown in FIG. 14, the information of the selected entry position number EPN can be obtained from each segment in the EPN storage unit 41 as information of one entry selected from the unused entries. Accordingly, when there is an updating request for an entry, the unused entry can be immediately selected based on the given information.

Figure 18:
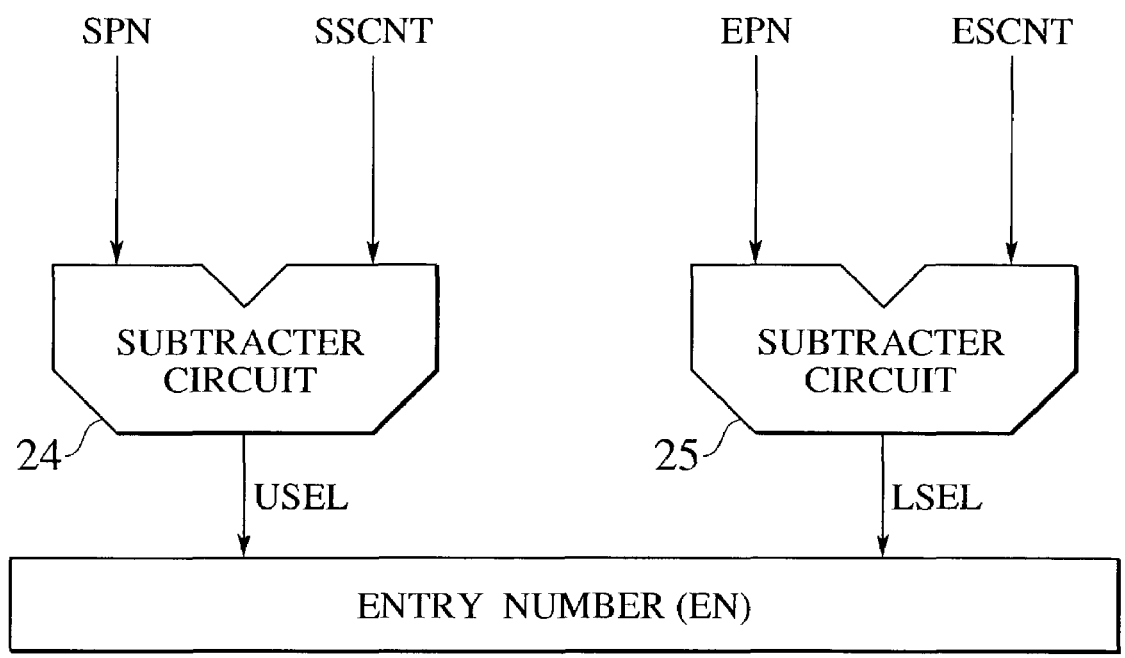
FIG. 18 is a schematic diagram illustrating a process to determine an entry number EN.

Since each selected segment position number SPN and each selected entry position number EPN do not indicate the number of the segment or the entry itself, the entry number EN is determined by a method as follows. Herein, as an example, the arrangement for deriving the entry number EN uses subtracter circuits 24 and 25 as shown in FIG. 18.

First, a method of deriving the segment including the entry to be updated is as follows. Specifically, referring to FIG. 18, the subtracter circuit 24 is operated using a "value of the segment shuffle counter 16" referred to as SSCNT and a "value of the selected segment position number SPN" referred to as SPN. The operation is expressed as follows.

$$0-(SSCNT-SPN)=SPN-SSCNT=USEL[2:0] \quad (1)$$

The result thereof is produced as a value of three bits and denoted as USEL.

Next, a method of deriving the number of the target updating entry in each segment is as follows. Specifically, referring to FIG. 18, the subtracter circuit 25 is operated using a "value of the entry shuffle counter 14" referred to as ESCNT and a "value of the selected entry position number EPN" referred to as EPN. The operation is expressed as follows.

$$0-(ESCNT-EPN)=EPN-ESCNT=LSEL[2:0] \quad (2)$$

The result thereof is also produced as a value of three bits and denoted as LSEL.

With the operations described above, the number of the selected target entry to be updated is specified by six bits of the total of USEL and LSEL. Herein, USEL is on the higher order side of the entry data, and LSEL is on the lower order side of the entry data. The entry number EN can be thus derived.

Figure 19:
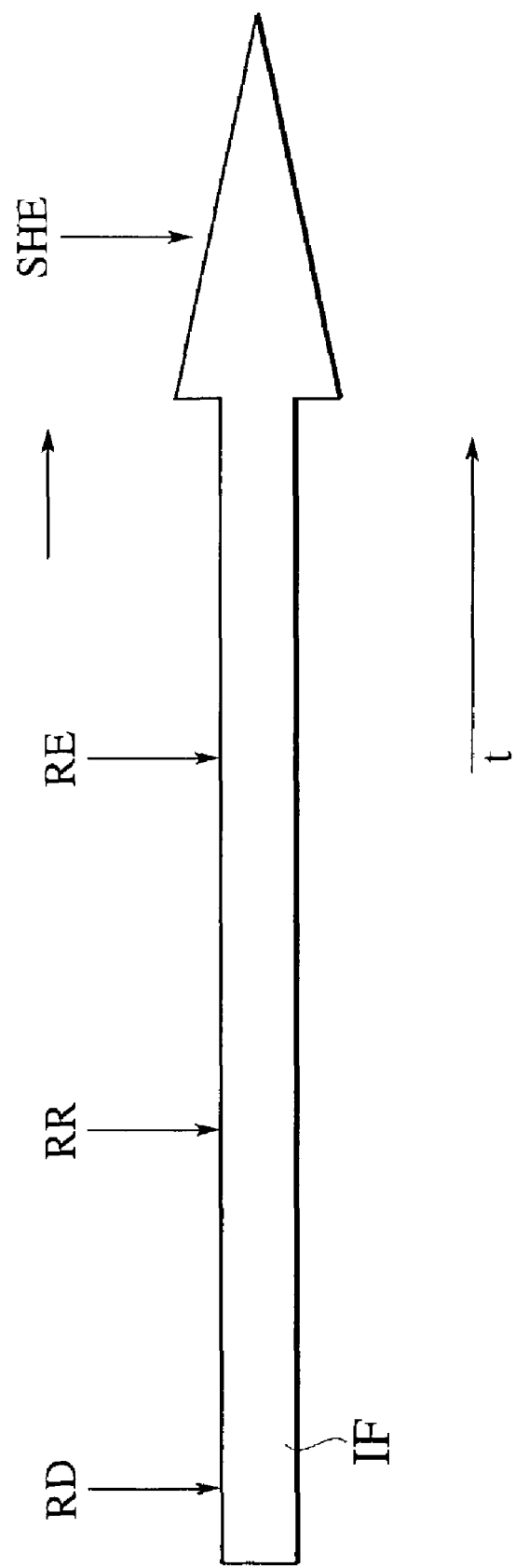
FIG. 19 is a schematic diagram illustrating a processing flow on a time axis for updating of the entry and executing entry shuffle.

The method of generating the shuffle signals is as follows. Specifically, the segment shuffle signal SSH is generated immediately after a certain entry is actually updated. Explaining the relationship between updating the entry and execution of shuffle on a time axis, as shown in FIG. 19, the sequence to the arrow of a processing flow IF: updating demand RD, updating restart RR, updating end RE, and shuffle execution SHE.

Figure 20:
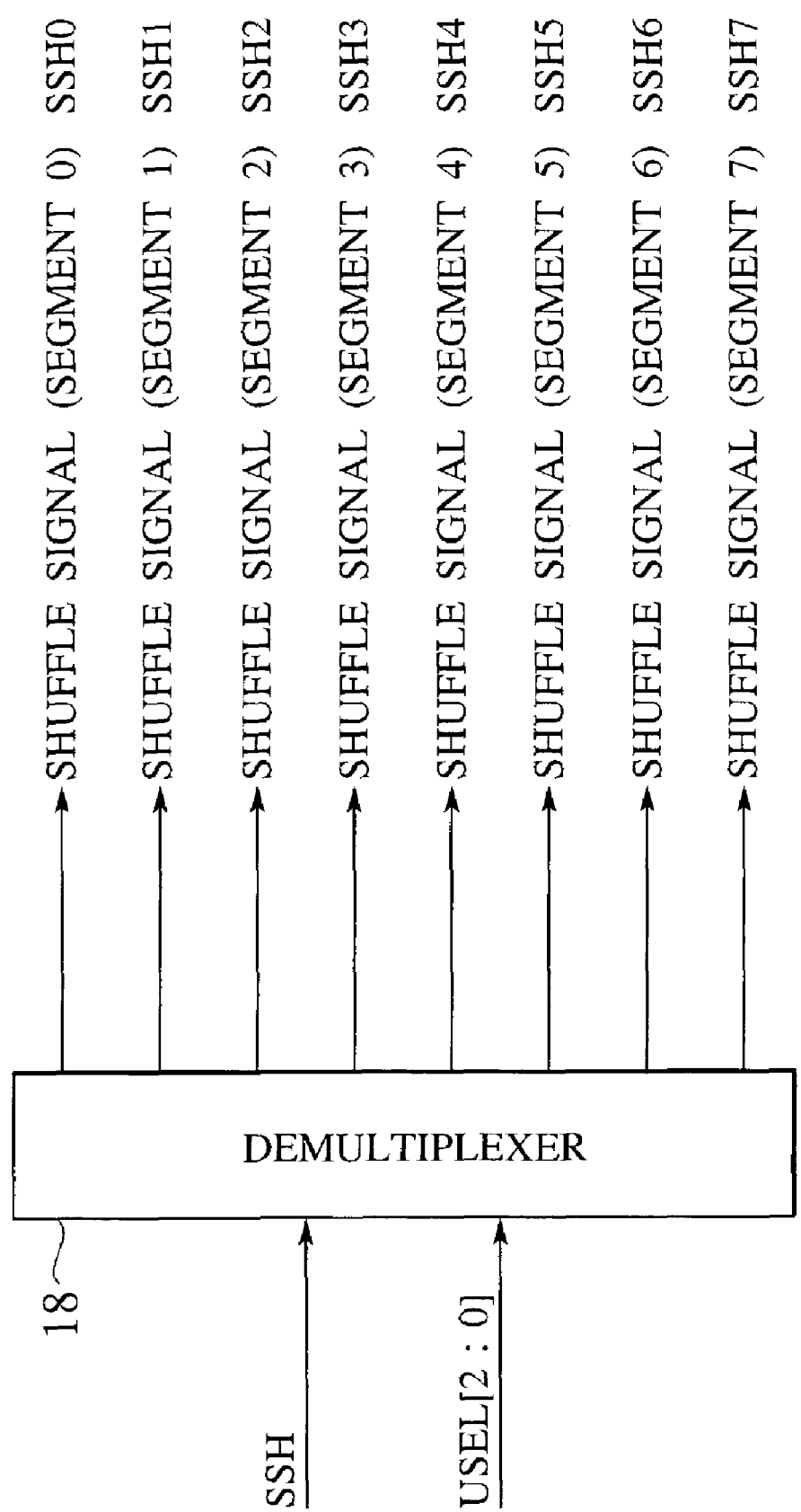
FIG. 20 is a block diagram schematically illustrating supply of a shuffle signal to the segment.

As to the segment shuffle signal SSH, the segment shuffle SSH is issued to the segment shuffle counter 16 each time to the segment shuffle counter 16 each for the entry shuffle counter 14, the entry shuffle signal ESH is issued to the entry shuffle counter 14 of the segment including the target entry to be updated. In this method, the segment shuffle signal SSH is supplied to only the segment selected by the value of USEL. For example, the segment shuffle signal is supplied to the segment by sending the segment shuffle signal SSH and USEL[2:0] to a demultiplexer 18 as shown in FIG. 20. Specifically, when the segment shuffle signal SSH and USEL [2:0] are sent to the demultiplexer 18, a shuffle signal (segment 0) SSH0, a shuffle signal (segment 1) SSH1 . . . , or a shuffle signal (segment 7) SSH7 is generated. Concretely, when USEL[2:0]="0," the segment shuffle signal SSH is supplied to only the segment 0. When USEL [2:0]= "1," the segment shuffle signal SSH is supplied to only the segment 1. Similarly, when USEL [2:0]="7," the segment shuffle signal SSH is supplied to only the segment 7.

In the case of a cache memory of a fully associative system, when the entry to be updated is selected, a method of randomly selecting the entry is used to avoid a complicated circuit design. Accordingly, there is a possibility that a more frequently used entry may be updated. In contrast, according to the cache memory and the updating method thereof of the present invention, the entry to be updated can be automatically selected from among unused entries, so that time is not wasted and high efficiency can be achieved.

According to the cache memory system of the present invention, since it is unnecessary to randomly select the entry to update the cache memory, it is unlikely that a more frequently used entry will be updated, and the entry to be updated can be automatically selected from among the unused entries. Consequently, a cache memory system with high efficiency can be provided.

Second Embodiment

As described in the cache memory system according to the first embodiment of the present invention, upon retrieval of the entry to be updated, when the unit entry presence signal V does not represent a valid signal, i.e., when there is no entry (unused) that is not hit, the entry to be updated is actually randomly selected. When there is no entry that is not hit because of the number of entries in cache memory 8, the entry to be updated is randomly selected. The case where there is no entry that is not hit, because the period TI of the interval timer 3 is extremely long, can be handled by setting a short period TI of the interval timer 3. However, if all the disclosed operations are managed by the software, the amount of handled data becomes enormous.

Figure 21:
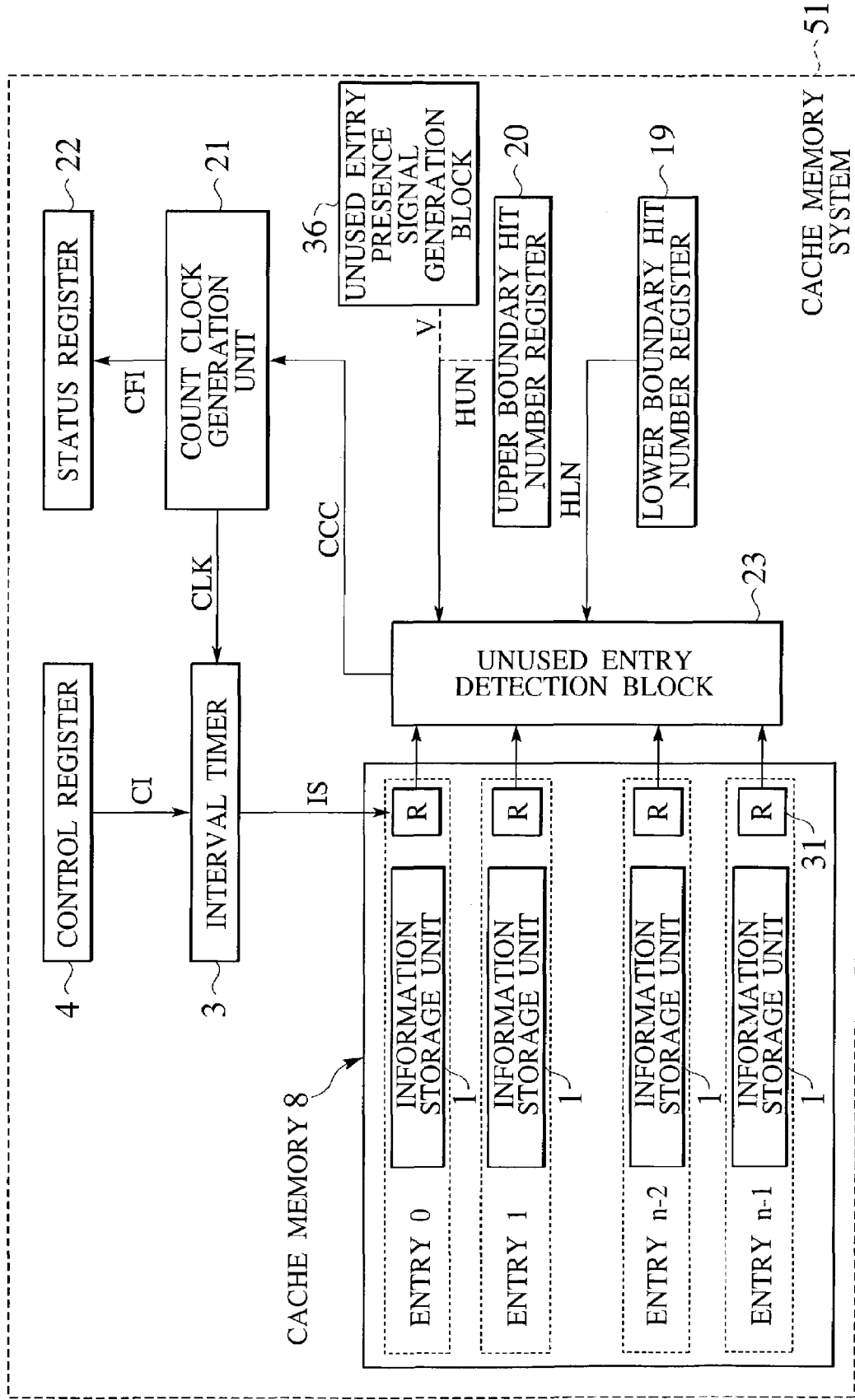
FIG. 21 is a block diagram schematically showing a cache memory system according to a second embodiment of the present invention, including the cache memory and a count control mechanism for the interval timer.

In the cache memory system 51 according to the second embodiment of the present invention, the retrieval of the entry to be updated is automatically performed by hardware. The cache memory system 51 according to the second embodiment of the present invention includes the cache memory 8 and a count control mechanism provided by the interval timer 3. As shown in FIG. 21, the entire arrangement comprises the cache memory 8, an unused entry detection block 23, a count clock generation unit 21, a status register 22, the control register 4, the interval timer 3, a lower boundary hit number register 19, and an upper boundary hit number register 20. The cache memory 8 comprises the plurality of entries 0, 1 . . . , n−2, and n−1, the plurality of information storage units 1 corresponding to the plurality of entries and the reference bit storage units 31 storing the respective reference bits R of the plurality of information storage units 1. As shown in FIG. 21, an unit entry presence signal (V) generation block 36 can be used instead of the upper boundary hit number register 20.

Similar to the cache memory system 50 according to the first embodiment of the present invention shown in FIGS. 1 and 2, the interval timer 3 generates the generation alternation signal IS transmitted to the reference bit storage units 31 at the period TI of the interval timer 3 in accordance with the control information CI set in the control register 4. Similar to the first embodiment shown in FIG. 2, the generation alternation signal IS is used for managing the register information of each reference bit storage unit 31. The clock CLK required for operating the interval timer 3 is supplied from the count clock generation unit 21 of FIG. 21. The count clock generation unit 21 generates the clock CLK for operating the interval timer 3 at a period obtained by arbitrarily dividing the main clock supplied to the processor. The period of the clock CLK generated by the count clock generation unit 21 is actually controlled by a count clock control signal CCC generated from the unused entry detection block 23. The period of the clock CLK for operating the interval timer 3, can be adjusted to be longer or shorter by the count clock control signal CCC.

As shown in FIG. 21, the unused entry detection block 23 receives an upper boundary hit number signal HUN from the upper boundary hit number register 20 or the unit entry presence signal V from the unused entry presence signal generation block 36. Alternatively, the unused entry detection block 23 also receives a lower boundary hit number signal HLN from the lower boundary hit number register 19 and transmits the count clock control signal CCC to the count clock generation unit 21. The status register 22 is a storage element storing clock frequency information CFI of the clock CLK generated from the count clock generation unit 21.

The frequency or the period of the count clock control signal CCC generated from the unused entry detection block 23 is determined in the following manner. Specifically, it is determined whether the total number of entries having internal status values of the reference bits R stored in the reference bit storage units 31, of "1" is larger than a certain threshold or smaller than another certain threshold. When the total number is larger than the certain threshold (upper boundary hit number), the frequency of the count clock control signal CCC is increased (the period is shortened). When the total number thereof is smaller than the certain threshold (lower boundary hit number), the frequency of the count clock control signal CCC is reduced (the period is lengthened).

Giving a concrete example, when the unit entry presence signal V from the unused entry presence signal generation block 36 is "0," there is no unused entry. Thus, the period TI of the interval timer 3 is shortened. In other words, the period of the clock CLK generated by the count clock generation unit 21 is shortened. In another method, when there is a large number of hit entries having internal status values of the respective reference bits R that are "1" and the number of hit entries is larger than a certain threshold (upper boundary hit number which is a value set in the upper boundary hit number register 20 in FIG. 13), the period of the clock CLK generated by the count clock generation unit 21 is shortened. When the number of hit entries having internal status values of the respective reference bits R of "1" is larger than the upper boundary hit number as a value set in the upper boundary hit number register 20, as shown in FIG. 21, the upper boundary hit number signal HUN is transmitted from the upper boundary hit number register 20 to the unused entry detection block 23.

In contrast, when there is a large number of missed entries having internal status values of the respective reference bits R of "0", the period TI of the interval timer 3 is lengthened to monitor the use status of the entry for a long period. When the number of hit entries having internal status values of the respective reference bits R of "1" is smaller than the lower boundary hit number, which is a value set in the lower boundary hit number register 19, the lower boundary hit number signal HLN is transmitted from the lower boundary hit number register 19 to the unused entry detection block 23.

In the cache memory according to the second embodiment of the present invention, a flow chart based on a determination algorithm of the unused entry detection block 23 includes steps S1 to S5 as shown in FIG. 22.

(a) In step S1, the generation alternation signal IS is sent from the interval timer 3 to the reference bit storage units 31.

(b) Subsequently, in step 2, it is determined whether the number of hit entries having internal status values of the respective reference bits R that are "1" is larger than the upper boundary hit number which is a value set in the upper boundary hit number register 20.

(c) If the result of step 2 is YES, in step S5, the frequency of the count clock control signal CCC is increased to shorten the period TI of the interval timer 3. The procedure then returns to step S1.

(d) If the result of step 2 is NO, in step S3, it is determined whether the number of hit entries having internal status values of the respective reference bits R that are "1" is smaller than the lower boundary hit number which is a value set in the lower boundary hit number register 19.

(e) If the result of step 3 is YES, the procedure proceeds to step S4. The frequency of the count clock control signal CCC is reduced to lengthen the period TI of the interval timer 3. Thereafter, the procedure returns to step S1.

(f) If the result of step 3 is NO, the procedure returns to step S1.

As described above, the period TI of the interval timer 3 is automatically controlled in accordance with the number (hit number) of used entries. Accordingly, in the cache memory system 51 according to the second embodiment of the present invention, the function of randomly selecting the unused entry can efficiently operate without fail. Moreover, even a case where the frequency of updating the cache by an application that varies with time can be flexibly and automatically handled.

According to the cache memory system 51 of the present invention, software does not need to frequently repeat the setting of the period TI of the interval timer 3, and the period TI of the interval timer 3 used for implementing the algorithm can be automatically adjusted.

Other Embodiments

As described above, the present invention has been described with the first and the second embodiments, but it should not be understood that the description and the drawings as part of the present disclosure may limit the present invention. Various alternations, examples, and operational techniques will be apparent for those skilled in the art from the present disclosure. Accordingly, the technical scope of the present invention is determined by only the invention specific matter according to the scope of claims reasonable from the above description.

The cache memory system according to the embodiments of the present invention can be certainly applied to a general LSI or semiconductor integrated circuit. The cache memory system can be applied to a digital signal processor (DSP) for video/audio processing or custom LSI that uses a cache memory of the fully associative system. Therefore, the cache memory system can be applied not only to a CPU or a timer LSI, but also to a general semiconductor integrated circuit or the like, that uses a cache memory of the fully associative system.

The flowchart described in the embodiments of the present invention can also be applied to execution of a program. Furthermore, it is apparent that such a program can be provided by a medium storing the program, such as a ROM, a CD-ROM, and a CD-R/W.

According to the cache memory system, the cache memory, the updating method for the cache memory system and for the cache memory, and the updating program of the cache memory system of the present invention, when updating the cache memory, provides a process in which it is unnecessary to randomly select an entry. Accordingly, the cache memory system is unlikely to update more frequently used entries, and the entry to be updated can be automatically selected from among the unused entries.

According to the cache memory system, the cache memory, the updating method for the cache memory system and for the cache memory, and the updating program for the cache memory system of the present invention, the time period can be automatically adjusted by software, thus providing efficient time use.

What is claimed is:

1. A cache memory system comprising:
a cache memory having a plurality of data storage areas for storing entry data, each of the data storage areas associated with an information storage unit configured to fetch and store a part of the information stored in a main memory;
a reference bit storage unit configured to store a use status of information stored in the information storage unit, the use status being stored for a certain time period; and
a hit detection circuit connected to the information storage unit, the hit detection circuit configured to generate a hit signal to the reference bit storage unit.

2. The cache memory system of claim 1, further comprising an interval timer connected to the reference bit storage unit.

3. The cache memory system of claim 2, further comprising a control register connected to an interval timer.

4. The cache memory system of claim 2, wherein an interval timer receives a control signal from a control register and generates a generation alternation signal that is transmitted to a use status storage unit and a reference bit judgement circuit, connected to the reference bit storage unit.

5. The cache memory system of claim 1, wherein of the reference bit storage unit further comprises:
a use status storage unit configured to store a use status of a reference bit associated with each of the information storage units, the use status being stored for a certain time period; and
a reference bit judgement circuit configured to receive information stored in the use status storage unit,
wherein a selected reference bit storage unit is configured to store a selected reference bit selected by the reference bit judgement circuit, and
a reference bit judgement control register is connected to the reference bit storage unit.

6. The cache memory system of claim 5, wherein the reference bit judgement circuit receives a judgement control signal from a reference bit judgement control register and generates a final selected reference bit for each of the entries, based on past and current hit status.

7. The cache memory system of claim 1, wherein the hit detection circuit compares cache address information from each of the information storage units with processor cache access address information and generates a hit signal to the reference bit storage unit.

8. The cache memory system of claim 1, wherein the plurality of entries are assigned to a segment, the segment comprising:
a selector configured to receive output signals from the respective reference bit storage unit for the plurality of entries;
a priority encoder configured to receive output signals corresponding to the plurality of entries from the selector and to generate a position number of a selected entry;
a NAND gate configured to receive the plurality of output signals from the selector in a branching manner and to generate an unused entry presence signal;
an entry shuffle counter configured to receive an entry shuffle signal and to transmit an entry selector control signal to the selector.

9. The cache memory system of claim 1, wherein the plurality of entries are assigned to a plurality of segments, each segment of the plurality of segments comprising:
unused entry presence signal storage units, each of which stores the unused entry presence signal of each of the segments;
a selector configured to receive the unused entry presence signal from each of the unused entry presence signal storage units;
a priority encoder configured to receive output signals corresponding to the plurality of segments from the selector and to generate a position number of a selected segment;
an OR gate configured to receive the unused entry presence signal in a branching manner and to generate an unit entry presence signal; and
a segment shuffle counter configured to receive a segment shuffle signal and to transmit a segment selector control signal to the selector.

10. The cache memory system of claim 1, further comprising:
an unused entry detection block connected to the reference bit storage unit;
an upper boundary hit number register connected to the unused entry detection block;
a lower boundary hit number register connected to the unused entry detection block;
a count clock generation unit connected to the unused entry detection block, the count clock generation unit receiving a count clock control signal; and
a status register connected to the count clock generation unit.

11. The cache memory system of claim 1, further comprising:
an unused entry detection block connected to the reference bit storage unit;
an unused entry presence signal generation block connected to the unused entry detection block;
a lower boundary hit number register connected to the unused entry detection block;
a count clock generation unit connected to the unused entry detection block, the count clock generation unit receiving a count clock control signal; and
a status register connected to the count clock generation unit.

12. An updating method for a cache memory, the cache memory having a plurality of segments, each segment of the plurality of segments including a plurality of entries, comprising:

sending reference bits of the respective entries from reference bit storage units in a processing circuit and generating a position number of a selected entry and an unused entry presence signal; and performing entry shuffle by repeating rotation of the plurality of entries and generating the position number of the selected entry and the unused entry presence signal.

13. The updating method for a cache memory of claim 12, further comprising:

sending the unused entry presence signal of the respective segments from unused entry presence signal storage units to a processing circuit and generating a position number of a selected segment and an unused entry presence signal; and performing segment shuffle by repeating rotation of the plurality of segments and generating the position number of the selected segment and the unused entry presence signal.

14. An updating method for a cache memory system, comprising:

sending a generation alternation signal from an interval timer to a reference bit storage unit storing a reference bit;

determining whether a number of hit entries is larger than an upper boundary hit number set in an upper boundary hit number register;

determining whether the number of hit entries is smaller than a lower boundary hit number set in a lower boundary hit number register when the number of hit entries is not larger than the upper boundary hit number;

shortening a period of an interval timer when the number of hit entries is larger than the upper boundary hit number; and lengthening the period of the interval timer when the number of hit entries is smaller than the lower boundary hit number.

* * * * *